United States Patent [19]
Walker

[11] Patent Number: 6,134,664
[45] Date of Patent: Oct. 17, 2000

[54] METHOD AND SYSTEM FOR REDUCING THE VOLUME OF AUDIT DATA AND NORMALIZING THE AUDIT DATA RECEIVED FROM HETEROGENEOUS SOURCES

[75] Inventor: Jeffrey H. Walker, Papillon, Nebr.

[73] Assignee: PRC Inc., McLean, Va.

[21] Appl. No.: 09/109,866

[22] Filed: Jul. 6, 1998

[51] Int. Cl.[7] .................................................. G06F 13/00
[52] U.S. Cl. ............................................................. 713/201
[58] Field of Search .................................... 713/200, 201, 713/202; 709/229; 380/3, 200, 4, 201, 35, 202, 30, 203, 51

[56] References Cited

U.S. PATENT DOCUMENTS

| | | | |
|---|---|---|---|
| 5,557,742 | 9/1996 | Smaha et al. ............................ | 713/200 |
| 5,561,795 | 10/1996 | Sarkar . | |
| 5,745,753 | 4/1998 | Mosher, Jr. . | |
| 5,778,076 | 7/1998 | Kara et al. ................................ | 380/51 |
| 5,987,611 | 11/1999 | Freund .................................... | 713/201 |

OTHER PUBLICATIONS

"DID (Distribution Intrusion Detection System)—Motivation, Architecture, and An Early Prototoype", S.R. Snapp, et al., Proc. 14th Nat'l Computer Security Conf., Washington, D.C. (Oct. 1991), pp. 167–176.

"An Intrusion–Detection Model", D. Denning, IEEE Transactions on Software Engineering, vol. SE–13, No. 2, Feb. 1987.

*Primary Examiner*—Robert W. Beausoliel, Jr.
*Assistant Examiner*—Pierre Eddy Elisca
*Attorney, Agent, or Firm*—Lowe Hauptman Gopstein Gilman & Berner

[57] ABSTRACT

A method of reducing the volume of native audit data from further analysis by a misuse and intrusion detection engine is disclosed. Typically, more than ninety percent of the volume of audit information received from heterogeneous operating systems does not need to be analyzed by a misuse and intrusion detection engine because this audit information can be filtered out as not posing a security threat. Advantageously, by reducing (eliminating) the volume of audit information, a misuse and intrusion engine can more quickly determine whether a security threat exists because the volume of data that the engine must consider is drastically reduced. Also, advantageously, the audit information that is forwarded to the engine is normalized to a standard format, thereby reducing the computational requirements of the engine. The method of reducing the volume of native audit data includes comparing each of the native audits against at least one template and against at least one native audit. By matching the native audits against templates of native audits that do not pose security threats, the native audits that do not pose security threats can be reduced out from further consideration. The native audits that are determined to pose potential security threats are transformed into a standardized format for further analysis by a misuse and intrusion detection engine.

21 Claims, 39 Drawing Sheets

FIG. 7A

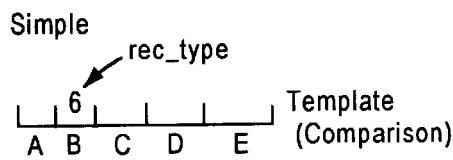

Simple Template (Comparison)

FIG. 7B

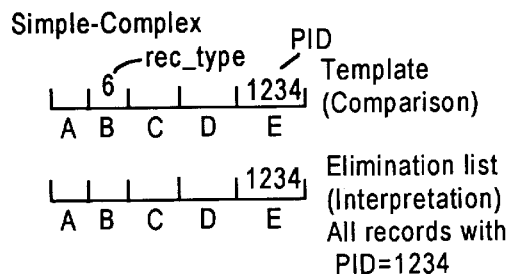

Simple-Complex Template (Comparison)

Elimination list (Interpretation) All records with PID=1234

FIG. 7C

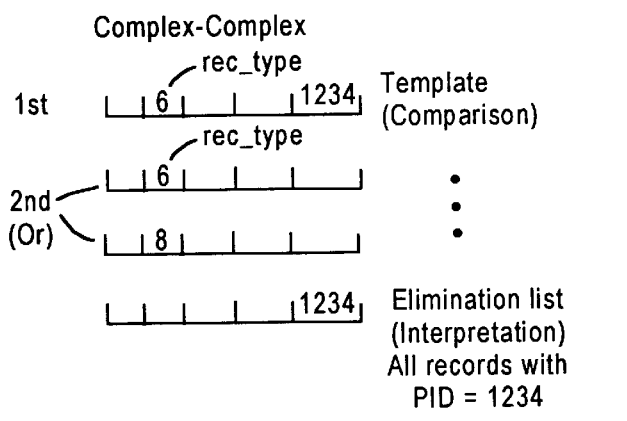

Complex-Complex Template (Comparison)

Elimination list (Interpretation) All records with PID = 1234

FIG. 7D

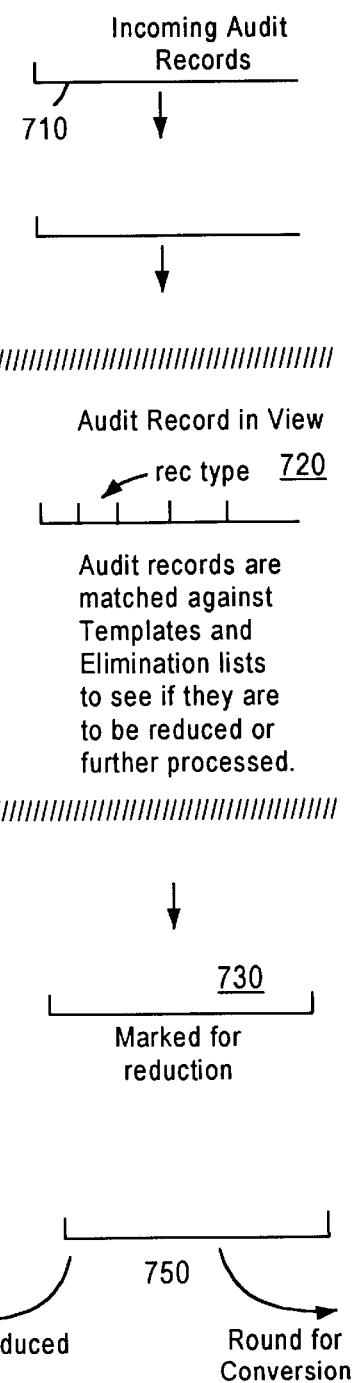

Incoming Audit Records 710

Audit Record in View — rec type 720

Audit records are matched against Templates and Elimination lists to see if they are to be reduced or further processed.

730 Marked for reduction

740 Copies record for in progress actrive scenarios (In case scenerio fails)

750 Reduced / Round for Conversion

METHOD AND SYSTEM FOR REDUCING THE VOLUME OF AUDIT DATA AND NORMALIZING THE AUDIT DATA RECEIVED FROM HETEROGENEOUS SOURCES

FIELD OF THE INVENTION

The present invention relates generally to intrusion detection systems for computer systems, and more particularly, to a method and apparatus for analyzing audit data received from heterogeneous sources, reducing the volume of the analyzed audit data from further consideration, normalizing audit trail records received from the heterogeneous sources to a standardized format, and performing an initial review of the normalized audit trail records. Based upon the initial review, intrusions can be detected and alerts provided.

BACKGROUND OF THE INVENTION

The development of the computer and its astonishingly rapid improvement have ushered in the Information Age that affects almost all aspects of commerce and society. Just like the physical infrastructures that support the American economy, there is a highly developed computer infrastructure that supports the American and worldwide economy.

Besides traditional physical threats to United States security, the security of the United States is also dependent on protecting the computer infrastructure that supports American government and industry. The computer infrastructure is open to attack by hackers and others, who could potentially wreak havoc.

The President of the United States has recognized the existence of these infrastructures and has created the President's Commission on Critical Infrastructure Protection. This Commission was constituted to determine which industries are critical and whether these industries were vulnerable to cyber attack. The Commission issued a report and deemed transportation, oil and gas production and storage, water supply, emergency services, government services, banking and finance, electrical power and telecommunications to be critical infrastructures which rely on the computer infrastructure.

A personal computer and a modem with access to the Internet are all the tools that a computer hacker needs to conduct a cyber attack on a computer system. The rapid growth of a computer-literate population ensures that millions of people possess the skills necessary to consider a cyber attack. The computer literate population includes recreational hackers who attempt to gain unauthorized electronic access to information and communication systems. These computer hackers are often motivated only by personal fascination with hacking as an interesting game. Criminals, and perhaps organized crime, might also attempt personal financial gain through manipulation of financial or credit accounts or stealing services. Industrial espionage can also be the reason for a cyber attack on a competitor's computer system. Terrorists may attempt to use the computer infrastructure. Other countries may use the computer infrastructure for national intelligence purpose. Finally, there is the prospect of information warfare, which is a broad, orchestrated attempt to disrupt a United States military operation or significant economic activity.

A typical secure computer network has an interface for receiving and transmitting data between the secure network and computers outside the secure network. A plurality of network devices are typically behind the firewall. The interface may be a modem or an Internet Protocol (IP) router. Data received by the modem is sent to a firewall which is a network security device that only allows data packets from a trusted computer to be routed to specific addresses within the secure computer network. Although the typical firewall is adequate to prevent outsiders from accessing a secure network, hackers and others can often breach a firewall. This can occur by cyber attack where the firewall becomes overwhelmed with requests and errors are made permitting access to an unauthorized user. As can be appreciated, new ways of overcoming the security devices are developed everyday. An entry by an unauthorized computer into the secured network, past the firewall, from outside the secure network is called an intrusion. This is one type of unauthorized operation on the secure computer network.

Another type of unauthorized operation is called a misuse. A misuse is an unauthorized access by a computer within the secure network. In a misuse situation, there is no breach of the firewall. Instead, a misuse occurs from inside the secure computer network. A misuse can be detected when an authorized user performs an unauthorized, or perhaps, infrequent operation which may raise the suspicion that the authorized user's computer is being misused. For example, an unauthorized user could obtain the password of an authorized user and logon to the secured network from the authorized computer user's computer and perform operations not typically performed by the authorized user. Another example might be where a terrorist puts a gun to the head of an authorized user and directs the authorized user to perform unauthorized or unusual operations.

There are systems available for determining that a breach of computer security has occurred. These systems can broadly be termed intrusion detection systems. Existing intrusion detection systems can detect intrusions and misuses. The existing security systems determine when computer misuse or intrusion occurs. Computer misuse detection is the process of detecting and reporting uses of processing systems and networks that would be deemed inappropriate or unauthorized if known to responsible parties. An intrusion is an entry to a processing system or network by an unauthorized outsider.

Processing system misuse detection and reporting research has been funded by U.S. government agencies that have concerns for the confidentiality of their computer systems. Researchers have generally been associated with large research organizations or national laboratories. These institutions have required detailed knowledge of technical computer security, known threats and vulnerabilities, protection mechanisms, standard operational procedures, communications protocols, details of various systems' audit trails, and legal investigation of computer crimes. This misuse detection and reporting research has followed two basic approaches: anomaly detection systems and expert systems.

Anomaly detection systems look for statistically anomalous behavior.

These systems assume that intrusions and other security problems are rare and that they appear unusual when compared to other user behavior. D. Denning, "An Intrusion Detection Model," Proc 1986 IEEE Symp. Security & Privacy (April 1986) provides an anomaly detection model (hereinafter the "Denning Model") for detecting intrusions into computer systems. The Denning Model uses statistical scenarios for user, dataset, and program usage to detect "exceptional" use of the system.

There are variations of the Denning Model and different applications of these various models. Anomaly detection techniques such as those based on the Denning Model, however, have generally proven to be ineffective and inefficient. Anomaly detection techniques, for instance, do not detect most actual misuses. The assumption that computer misuses would appear statistically anomalous has been proven false. When scripts of known attacks and misuses are replayed on computers with statistical anomaly detection systems, few if any of the scripts are identified as anomalous. This occurs because the small number of commands in these scripts are insufficient to violate profiling models.

In general, anomaly detection techniques cannot detect particular instances of misuses unless the specific behaviors associated with those misuses also satisfy statistical tests without security relevance. Anomaly detection techniques also produce false alarms. Most of the reported anomalies are purely statistical and do not reflect security problems. These false alarms often cause system managers to resist using anomaly detection method because they increase the processing system workload without substantial benefits.

Another limitation with anomaly detection approaches is that users activities are often too varied for a single scenario and can result in many false alarms. Statistical measures also are not sensitive to the order in which events occur, and this may prevent detection of serious security violations that exist when events occur in a particular order. Scenarios that anomaly detection techniques use also may be vulnerable to conscious manipulation by users. Consequently a knowledgeable perpetrator may train the thresholds of detection system adaptive scenarios to accept aberrant behaviors as normal. Furthermore, statistical techniques that anomaly detection systems use require complicated mathematical calculations and, therefore, are usually computationally expensive.

Expert systems (also known as rule-based systems or production system) have had some use in misuse detection, generally as a layer on top of anomaly detection systems for interpreting reports of anomalous behavior. Since the underlying model was anomaly detection, they have the same drawbacks of anomaly detection techniques.

Expert system approaches, in addition, are themselves inherently inefficient. S. Snapp, et al., "DIDS (Distributed Intrusion Detection System)" Proc. $14^{th}$ Nat'l Computer Security Conf., Washington, D.C. (October 1991) describes one example of an expert system signature analysis model that detects misuse by looking for one specific event within a specific system context. In one study, this detection system was found to be two and four orders of magnitude slower than "hard-wired" techniques and much too slow for real-time operation. This also makes it impractical to use these systems to detect and report misuses of multiple associated processing systems through operation of a single misuse detection and reporting system.

Expert systems approaches are also not deterministic. Consequently, these rules are expressed in a declarative, non-procedural fashion. When rule changes occur, it is generally extremely difficult to predict how the new system will behave. This makes development and testing more complex and expensive. Moreover, expert system approaches are limited to the knowledge of the expert who programmed the rules into the system. However, an expert is only capable of programming the rules of behavior that the expert knows. Since there are often many different paths to a particular misuse, the expert will be unable to create rules that represent all of these paths.

More recent attempts at detecting misuse have relied on a signature mechanism with a signature being the set of events and transitions functions that define the sequence of actions that form a misuse. A misuse engine that uses this signature mechanism is described in detail in U.S. Pat. No. 5,557,742. The signature mechanism uses audit trail records typically generated by computer operating systems. The user selects a plurality of misuses that together form the signature mechanism. Although the signature mechanism goes a step beyond expert systems, it is similar to an expert system because it relies upon signatures or rules.

A need exists for an intrusion detection system which can provide early warning of potential misuses and intrusions without relying on particular rules or signatures which can be easily thwarted. Early warning can be provided by eliminating most of the audit trail records before a misuse and intrusion detection engine further analyzes the audit trail records.

SUMMARY OF THE INVENTION

It is, therefore, an object of the present invention to provide a method and apparatus for eliminating audit trail records from further consideration by an intrusion and misuse detection engine.

It is a further object of the present invention to normalize a portion of the audit trail records received from heterogeneous sources for further analysis by the misuse and intrusion detection engine.

A further object is to provide an early warning of a potential misuse or intrusion.

Another object is to use a weighting system using barriers and boundaries so that a potential misuse or intrusion is identified before it occurs.

An additional object is to provide an intrusion detection system in which particular misuses do not have to be known in advance and which does not require rule sets or signatures of particular misuses.

These and other objects of the present invention are achieved by a method of reducing the volume of native audit data from further analysis by a misuse and intrusion detection engine. Typically, more than ninety percent of the volume of audit information received from heterogeneous operating systems does not need to be analyzed by a misuse and intrusion detection engine because this audit information can be filtered out as not posing a security threat. Advantageously, by reducing (eliminating) the volume of audit information, a misuse and intrusion engine can more quickly determine whether a security threat exists because the volume of data that the engine must consider is drastically reduced. Also, advantageously, the audit information that is forwarded to the engine is normalized to a standard format, thereby reducing the computational requirements of the engine. The method of reducing the volume of native audit data includes comparing each of the native audits against at least one template and against at least one native audit. By matching the native audits against templates of native audits that do not pose security threats, the native audits that do not pose security threats can be reduced out from further consideration. The native audits that are determined to pose potential security threats are transformed into a standardized format for further analysis by a misuse and intrusion detection engine.

The foregoing objects are also achieved by a method of reducing the volume of native audits received from at least one operating system with each of the native audits being in a particular format. The particular format is identified for each of the received native audits. Each of the received identified native audits are compared against at least one template and it is determined if each of the native audits matches at least one template. Each of the matched native audits is reduced.

The foregoing objects are also achieved by an article including at least one sequence of machine executable instruction on a medium bearing the executable instructions in machine readable form. Execution of the instructions by one or more processors causes the one or more processors to identify the particular format for each of the received native audits. The one or more processors compares each of the received identified native audits against at least one template and determines if each of the native audits matches at least one template. The one or more processors reduces each of the matched native audits.

The foregoing objects are also achieved by a computer architecture for reducing the volume of native audits received from at least one operating system with each of the native audits being of particular format. The computer architecture includes identifying means for identifying a particular format for each of the received native audits. Comparing means are provided for comparing each of the received identified native audits against at least one template and determining if each of the native audits matches at least one template. Reducing means are provided for reducing each of the native audits.

The foregoing objects are also achieved by a computer system including a processor and a memory coupled to the processor, the memory having stored therein sequences of instructions, which, when executed by the processor, causes the processor to perform the steps of identifying a particular format for each of the received identified native audits. The processor performs the step of comparing each of the received identified native audits against at least one template. The processor determines if each of the native audits matches at least one template and reduces each of the matched audits.

Still other objects and advantage of the present invention will become readily apparent to those skilled in the art from following detailed description, wherein the preferred embodiments of the invention are shown and described, simply by way of illustration of the best mode contemplated of carrying out the invention. As will be realized, the invention is capable of other and different embodiments, and it several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIGS. 7A–7C are illustrations of simple, simple-complex and complex—complex comparisons and interpretations, respectively;

FIG. 7D is a flow diagram of the reduction process of the present invention.

BEST MODE FOR CARRYING OUT THE INVENTION

A method and apparatus for normalizing audit trail records received from heterogeneous sources to a standardized format, performing an initial review of the normalized audit trail records and reducing the number of audit trail records to be stored for later review are described. Based upon the initial review, intrusions can be detected and alerts provided. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. The present invention is usable in conjunction with a patent application entitled "Dynamic System Defense for Information Warfare" assigned to the instant assignee and filed on even date herewith and incorporated by reference into this specification in its entirety.

To a great extent, monitoring of user and process behavior (and detection of anomalies in that behavior) can be based on security-relevant audit information. Audited systems produce a huge amount of audit data which can be analyzed and interpreted to determine whether security breaches are occurring or have occurred. Analysis allows an Information Security Officer (ISO) to recognize suspicious behavior and to respond to the behavior quickly enough to effectively counter a possible security threat. The move towards distributed data handling systems requires security monitoring to ascertain a system wide security posture as opposed to determining that there is a potential security threat for a single computer. This means that a hacker may attack two distributed computers simultaneously and the ISO needs to be aware that a security threat exists. The ISO can then identify when people inadvertently or purposely exploit the systems security weaknesses. The present invention addresses the following specific needs:

1) reduces the volume of security relevant audit data,
2) performs timely audit analysis,
3) automates detection of suspicious behavior,
4) works with minimal user involvement,
5) helps define a model for security monitoring, and
6) allows an organization to respond to an evolving variety of threats.

Figure 1:
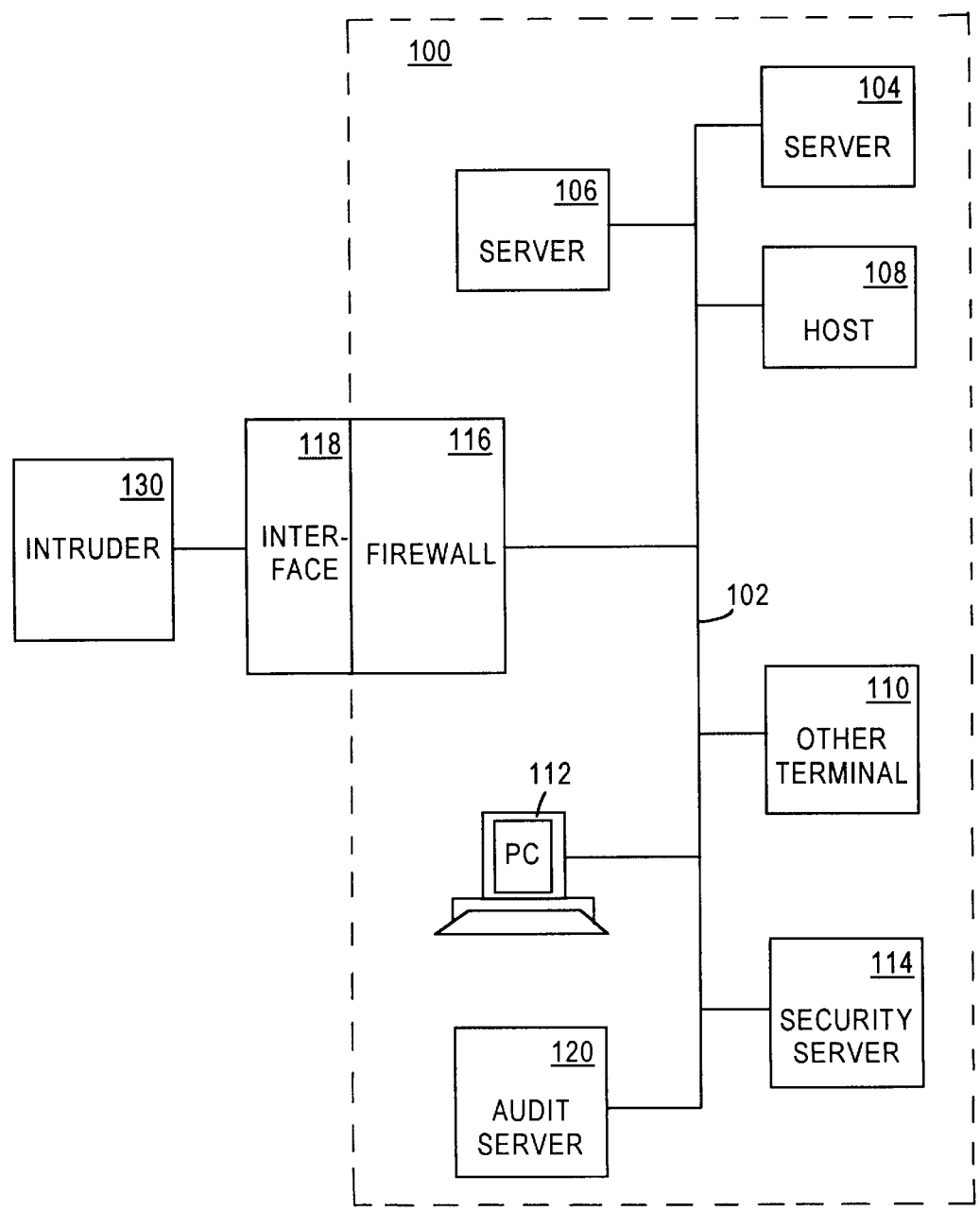
FIG. 1 is a high-level block diagram of an exemplary secured computer network on which the present invention can be used.

FIG. 1 is a block diagram illustrating an exemplary computer network 100 including a plurality of network devices on which an embodiment of the invention may be implemented. According to the present invention, an audit agent can reside on one or all of the nodes depicted on the computer network 100. As explained below, the audit agent resides on audit server 120 and receives audit trail information from each of the nodes on the computer network 120. The network devices include devices such as hosts, servers and personal computers. The present invention is usable on such networks as ARCnet, Ethernets and Token-Ring networks, wireless networks, among other networks. The network 100, in this example, has a central network cable 102, also known as media, which may be of any known physical configuration including unshielded twisted pair (UTP) wire, coaxial cable, shielded twisted pair wire, fiber optic cable, and the like. Alternatively, the network devices could communicate across wireless links.

The network 100 includes a network server 104 coupled to the network cable 102 and another server 106 coupled to the network cable 102. A host computer 108 is coupled to the network cable 102. A terminal 110 is coupled to the network cable 102. A personal computer 112 is coupled to the network cable 102. Each network device 104, 106, 108, 110, 112 can also be considered a node because each device has an addressable interface on the network. As can be appreciated, many other devices can be coupled to the network including additional personal computers, mini-mainframes, mainframes and other devices not illustrated or described which are well known in the art.

A security server 114 is coupled to the network cable 102. A firewall 116 connects the secure network 100 to an interface 118. The firewall 116 is a combination hardware and software buffer that is between the internal network 100 and external devices outside the internal computer network 100. The network devices within the internal network 100 appear within the dashed lines in FIG. 1, and the external devices outside the internal network appear outside the dashed lines in FIG. 1. The firewall 116 allows only specific kinds of messages from external devices to flow in and out of the internal network 100. As is known, firewalls are used to protect the internal network 100 from intruders or hackers who might try to break into the internal network 100. The firewall 116 is coupled to an interface 118. The interface 118 is external to the network 100 and can be a modem or an Internet Protocol (IP) router and serves to connect the secure network 100 to devices outside the secure network. An audit server is depicted at 120. For illustrative purposes, an intruder computer system is depicted at 130.

Figure 2:
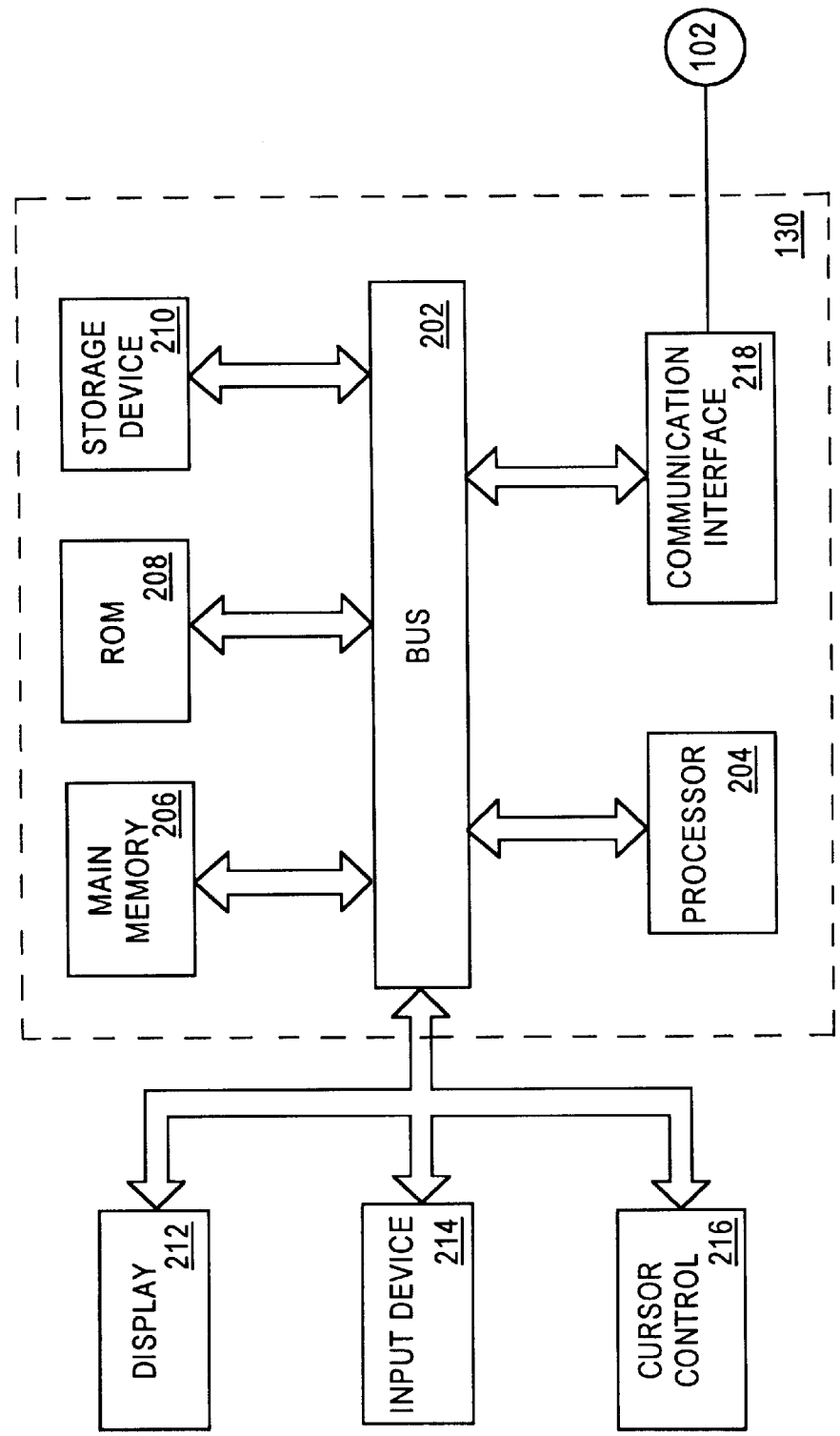
FIG. 2 is a high-level block diagram of an exemplary computer system with which the present invention can be used.

FIG. 2 is a block diagram illustrating an exemplary computer system, such as the audit server 120 depicted in FIG. 1, usable on the internal secure network 100. The present invention is usable with currently available personal computers, mini-mainframes, mainframes and the like. Although audit server 120 is depicted in FIG. 1 as a network device which is part of a wired local network, the audit server 120 is also envisioned as being connected to the network 100 by a wireless link.

Audit server 120 includes a bus 202 or other communication mechanism for communicating information, and a processor 204 coupled with the bus 202 for processing information. Audit server 120 also includes a main memory 206, such as a random access memory (RAM) or other dynamic storage device, coupled to the bus 202 for storing information and instructions to be executed by processor 204. Main memory 206 also may be used for storing temporary variables or other intermediate information during execution of instructions to be executed by processor 204. Audit server 120 further includes a read only memory (ROM) 208 or other static storage device coupled to the bus 202 for storing static information and instructions for the processor 204. A storage device 210, such as a magnetic disk or optical disk, is provided and coupled to the bus 202 for storing information and instructions.

Audit server 120 may be coupled via the bus 202 to a display 212, such as a cathode ray tube (CRT) or a flat panel display, for displaying information to a computer user. An input device 214, including alphanumeric and other keys, is coupled to the bus 202 for communicating information and command selections to the processor 204. Another type of user input device is cursor control 216, such as a mouse, a trackball, or cursor direction keys for communicating direction information and command selections to processor 204 and for controlling cursor movement on the display 212. This input device typically has two degrees of freedom in two axes, a first axis (e.g., x) and a second axis (e.g., y) allowing the device to specify positions in a plane.

The processor 204 can execute sequences of instructions contained in the main memory 206. Such instructions may be read into main memory 206 from another computer-readable medium, such as storage device 210. However, the computer-readable medium is not limited to devices such as storage device 210. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 206 causes the processor 204 to perform the process steps described below. In alternative embodiments, hard-wired circuitry may be used in place of or in combination with software instructions to implement the invention. Thus, embodiments of the invention are not limited to any specific combination of hardware circuitry and software.

Audit server 120 also includes a communication interface 218 coupled to the bus 202. Communication interface 218 provides a two-way data communication as is known. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. In the preferred embodiment the communication interface 218 is coupled to the network cable 102. Wireless links may also be implemented. In any such implementation, communication interface 218 sends and receives electrical, electromagnetic or optical signals which carry digital data streams representing various types of information. Of particular note, the communications through interface 218 permits the transmission or receipt of audit trail information.

To assist in fully describing the present embodiment of audit reduction system the following terms are used with the following definitions. Note, however, that although a term may be herein defined, this does not necessarily exclude an established definition for the term if using the established definition is consistent with the purpose and scope of the present invention. "Audit trail information" includes (1) system audit trail records; (2) processing system log file data; and (3) processing system-maintained security state data. The audit trail information is received as native data and recorded "Authentication" entails associating a user with a system identifier. A "subject" is an active entity, generally in the form of a person, process, or device, that causes information to flow among objects or changes in the processing system state. An "object" is a passive entity that contains or receives information. Access to an object implies access to the information it contains.

An "audit agent" is a group of processes that handles the conversion of native audit files to XHAC data and transfers that data to the audit server 120. "Audit processing" is the ability to read an input stream of data and to identify what type of data it is (i.e., BSM, C2, etc.) so that transformation may occur if needed. This is the input function of the agent. "Transformation" or "conversion" refers to the changing of data from one format (i.e., BSM) to another format (e.g., XHAC). This is the output function of the agent. The communication processing portion of the agent handles all of the communication logic between the agent and the manager as well as communication between the various processes that make up the agent.

Figure 3:
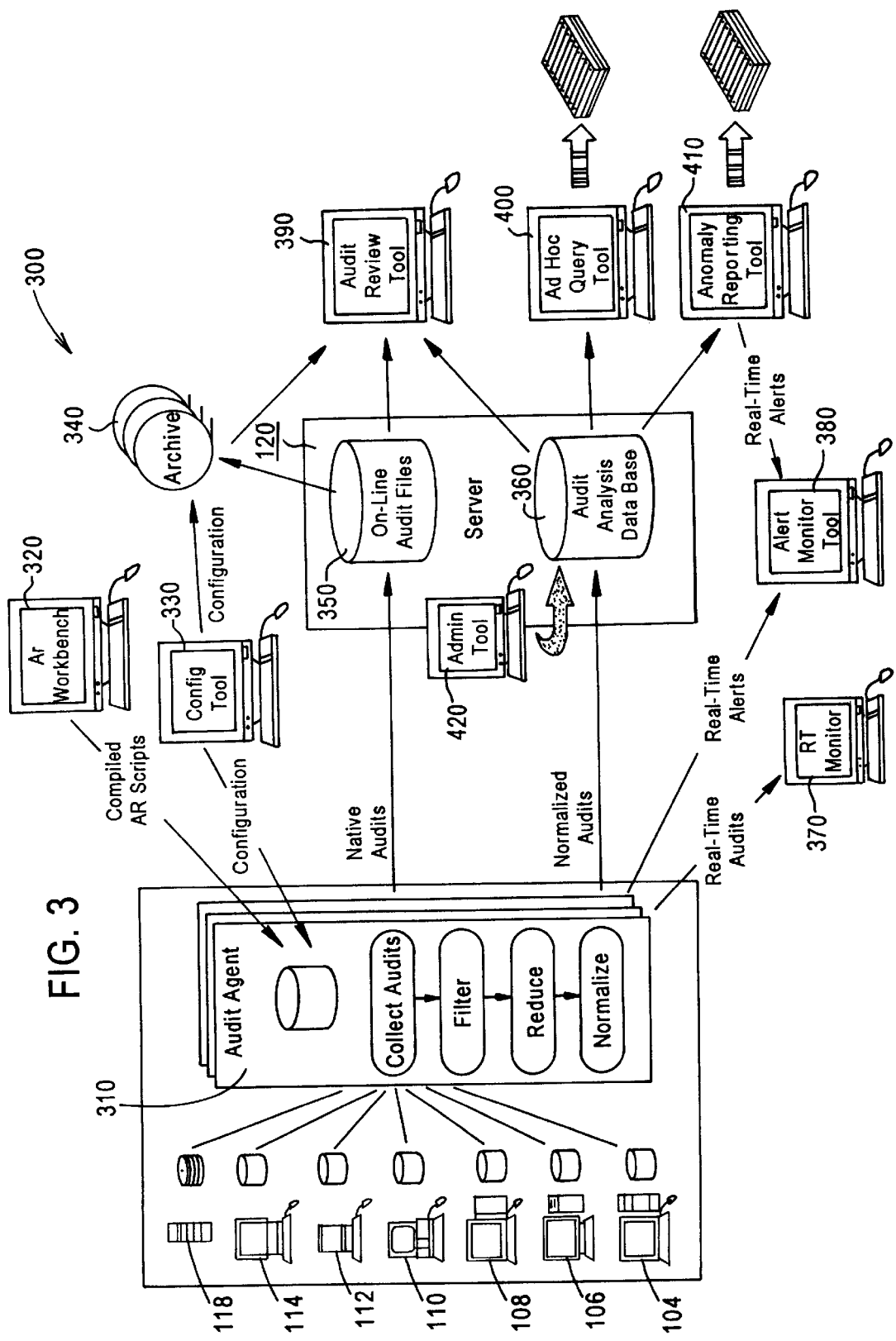
FIG. 3 is a high-level block diagram of the hardware used for an audit reduction agent.

With the above-definitions, the present embodiment may be understood as an auditing system, generally indicated at 300 in FIG. 3. The auditing system 300 includes the previously mentioned audit agent, indicated at 310, which resides on the audit server 120 (not shown in FIG. 3). The audit agent 310 receives native audits from each of the nodes on the network 104, 106, 108, 110, 112, 114, and 118. These audit trails include, for example, 1) system audit trails; 2) system log file data; and 3) data from third party applications and programs. The data from third party applications may use their own form of logging. As is known, the third party applications are used on many different types of processing systems. All of the information from these native audits is typically transient information which is subject to change based on the current activities on the processing system. As explained in greater detail below, the audit agent 310 collects the audits in the form of an audit trail, filters the audits, reduces the number of audits and normalizes some of the audits to a standard format for output to a security indications and warnings system (an intrusion and misuse detection engine).

The logical architecture in FIG. 3 illustrates an audit reduction workbench 320 which can be provided for communication with the audit agent 310. The audit reduction workbench 320 can be the personal computer 112 depicted in FIG. 1. The audit reduction workbench 320 can be used to build, maintain and send compiled audit reduction scripts to the audit agent 310. The audit reduction workbench 320 can be used to build audit processing rules and to build anomaly detection rules. A configuration tool 330 can be provided which can communicate with the audit agent 310. The configuration tool 330 can be the personal computer 112 in FIG. 1. The configuration tool can be used to define audit agent configurations and define audit processing parameters. Workbench 320 and tool 330 can be combined to use a single computer. Configuration tool 330 sends configuration settings to an archive 340. Audit agent 310 can reside on the audit server 120 or can reside on one or more computers in the network. As described below, audit agent 310 sends native audits to an on-line audit file storage device 350 associated with audit server 120 and sends normalized audits to an audit analysis database storage device 360 associated with audit server 120. Audit agent 370 sends real time audits to a real time monitor 370 and real time alerts to a real time alert monitor 380. Real time monitor 380 can be used to view audit alerts in near real time, view alerts and messages from other tools, view reports and activate other tools. Monitors 370 and 380 can be combined into a single computer or monitor. An audit review tool 390, which can be a personal computer, receives configuration information from archive 340, on-line audit files from on-line audit file storage device 350 and normalized audit information from audit analysis database storage device 360. An ad hoc query tool 400, which can be a personal computer, receives normalized audit information from audit analysis database storage device 360. Stored queries can be defined and processed periodically. Ad hoc queries can be generated and executed immediately. An anomaly reporting tool 410 receives normalized audit information from audit analysis database storage device 360 and can forward this information to the alert monitor tool 380. The anomaly reporting tool can generate alerts in near real time, replay audit scenarios and produce summary reports and statistics. An administrative tool 420 is associated with audit server 120 and may be in the form of a personal computer. The administrative tool 420 is used to define and maintain user descriptions/privileges, define and maintain group descriptions and define and maintain machine descriptions.

Figure 4:
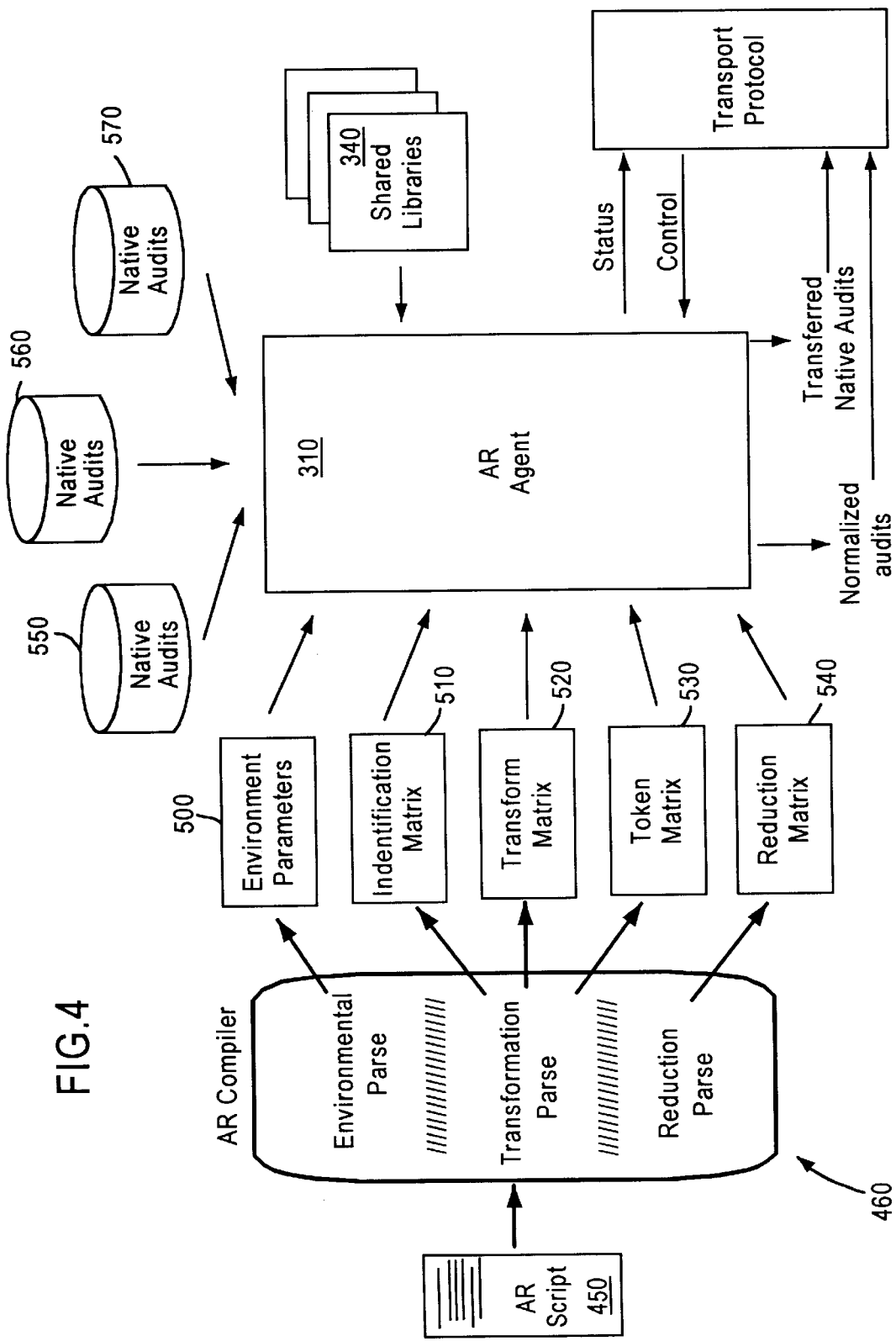
FIG. 4 is an illustration of a logical architecture used for the audit reduction agent.

As depicted in FIG. 4, the logical architecture of the audit agent 310 is depicted. Two mechanisms can be used to provide audit reduction code to the audit agent 310. The first mechanism is that the code can be specified in a script 450. The second mechanism is an audit reduction compiler 460. Using either mechanism, instructions are inserted into address space within the audit agent 310. There are five matrices that include information for the audit agent to use in dealing with incoming information. The first matrix is an environment parameters matrix 500 which provides information such as where to retrieve files, where the files are located in the directory structure, the naming convention, which operating system generated the files, and so forth. The second matrix is an identification matrix 510 which identifies each of the records in an incoming data stream based on information contained within each record. The third matrix is a transform matrix 520 which, once a record has been identified, can take one of two actions. The first action is direct transform meaning that the record is written into a different format and sent to the audit analysis database storage device 360. The second action is to send the record to a reduction matrix 540 (fifth matrix) and reduce out the record. Advantageously, in the present invention, about ninety percent of the records are reduced out and only about ten percent of the records are transformed and further analysis is performed. The fourth matrix is a token matrix 530 which allows the audit agent 310 to find specific information within a record.

As previously mentioned, the audit agent 310 receives three types of native audits: 1) system audit trails 550; 2) system log file data 560; and 3) data from third party applications and programs 570. The audit agent 310 can access shared libraries 340. Normalized audits and native audits are sent by the audit agent 310 to storage devices 360, 350, respectively using a transport protocol. Status and control are also transmitted and received within audit reduction system 300 using a transport protocol.

The native audits are special purpose records that include information about system activity and transactions. These native audits include data written in a particular format. This formatted information may be called an audit record. Audit trails contain records showing who has accessed a computer system and what operations he or she has performed during a given period of time. Audit trails are useful both for maintaining security and recovering lost transactions. A plurality of records constitute a file. Data and records from on-line audit file storage device 350 and archive 340 can be used for audit system 300 to reconstitute actual events that occur within the processing system.

Figure 5A:
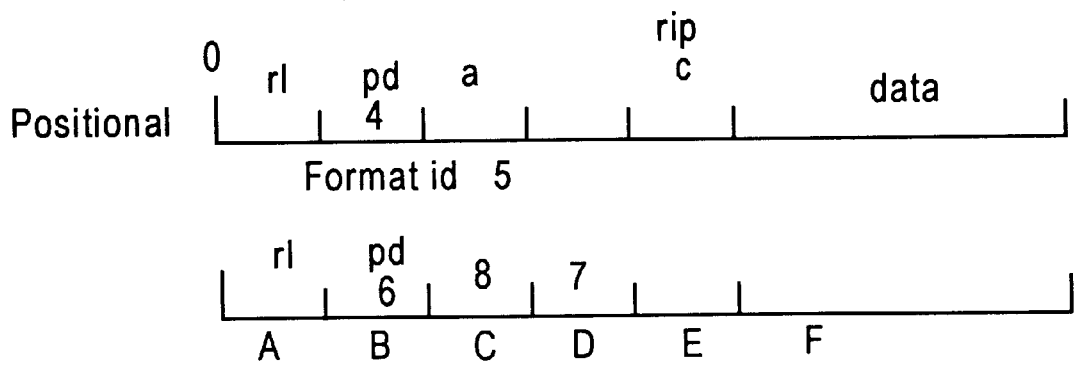
FIG. 5A is an illustration of a native audit.
Figure 5B:
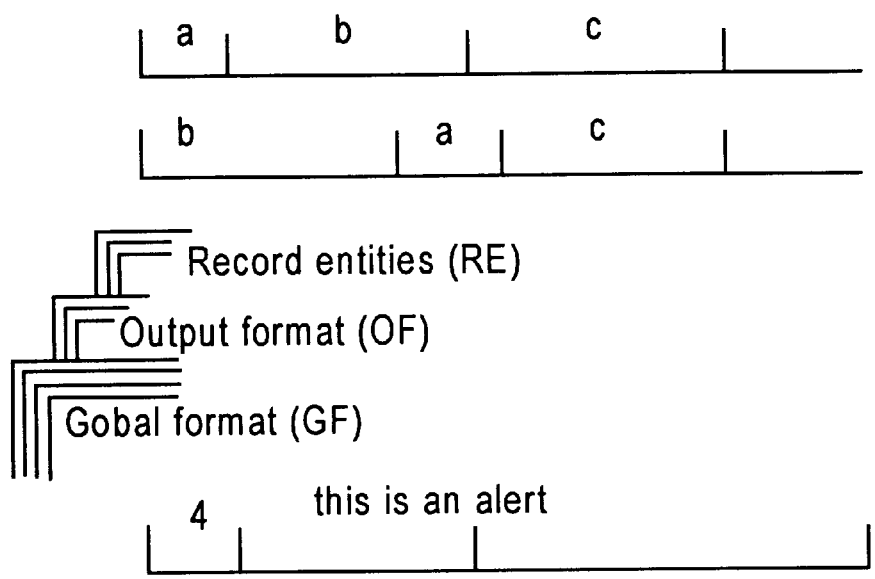
FIG. 5B is an illustration of audits is a diagram of an embodiment of the invention as used in several fleets of trucks in a wireless network.

Refer now to FIG. 5 where a native audit record is illustrated. The native formats can be in one of two formats; either positionally based or contextually based. A contextually based record is, for example, two different business cards from two different organizations where the information is positioned in different locations on the business card. On one business card the name may be in the middle of the card and on another business card, the name may be in the upper left hand corner. The context of the information, not the position, controls in a contextually based record. The best example of a contextually based format is syslog where the data can be free form. In this format the next field is determined by the previous field.

Syslog Example (Each field determines what should follow by the value in the field.)
1. VMUNIX: Reboot: This is a Reboot Message.
2. SendMail: Error reading SendMail config.
3. This is a plain text string.

For simplicity of explanation, the present invention is described in relation to the positionally based record depicted in FIG. 5. A positionally based record includes information contained in particular positions in the record. The audit agent 310 has access to templates to recognize contextually based records and positionally based records and obtain information from either type of record. However, for ease of discussion, the processing of contextually based records is not further discussed herein. It should be appreciated that the record illustrated in FIG. 5 is simplistic and is only being used for ease of explanation. It should be further appreciated that many other positionally based records and contextually based records can be used in the invention.

A brief overview of how the audit agent 310 uses the information contained in an audit trail record is now provided with a more detailed explanation provided in the detailed flow diagrams (FIGS. 8–39) and discussion thereof. A record is a stream of binary information. The record illustrated in FIG. 5 has an origin O which is the beginning of the record. The record comprises a plurality of fields. The first field (Field A) contains information concerning record length (RL). The second field (Field B) contains a primary discriminator (PID), for example 6, in the second field. The primary discriminator includes information on the type of record. There may be additional fields here, in this example, designated C, D, E, and perhaps other data thereafter.

For purposes of explanation, the previously described record having a PID of 4 has a format identifier (ID). For example, this record format may have an ID=5. All the records that are received having an ID=5 are going to be processed using the same set of instructions. The record is compared against a global format (see FIG. 5B) for an ID=5. An immediate warning or alert message can be sent to a system administrator if certain criteria are met. The criteria might be that someone is trying to hack into the data stream. For example, if invalid data is in the incoming record stream, it may be an indication that someone is hacking into the data stream. Expert systems use this method for determining intrusions and misuses. The global format contains a set of instructions for all formats, including format 5. This way cross format rules can be supported. The global format (GF) includes information as to which output format (OF) that is associated with this input record. The output format can be an ASCII representation of the input record, or it can be a normalized record type, or it can be any desired output format.

Figure 6:
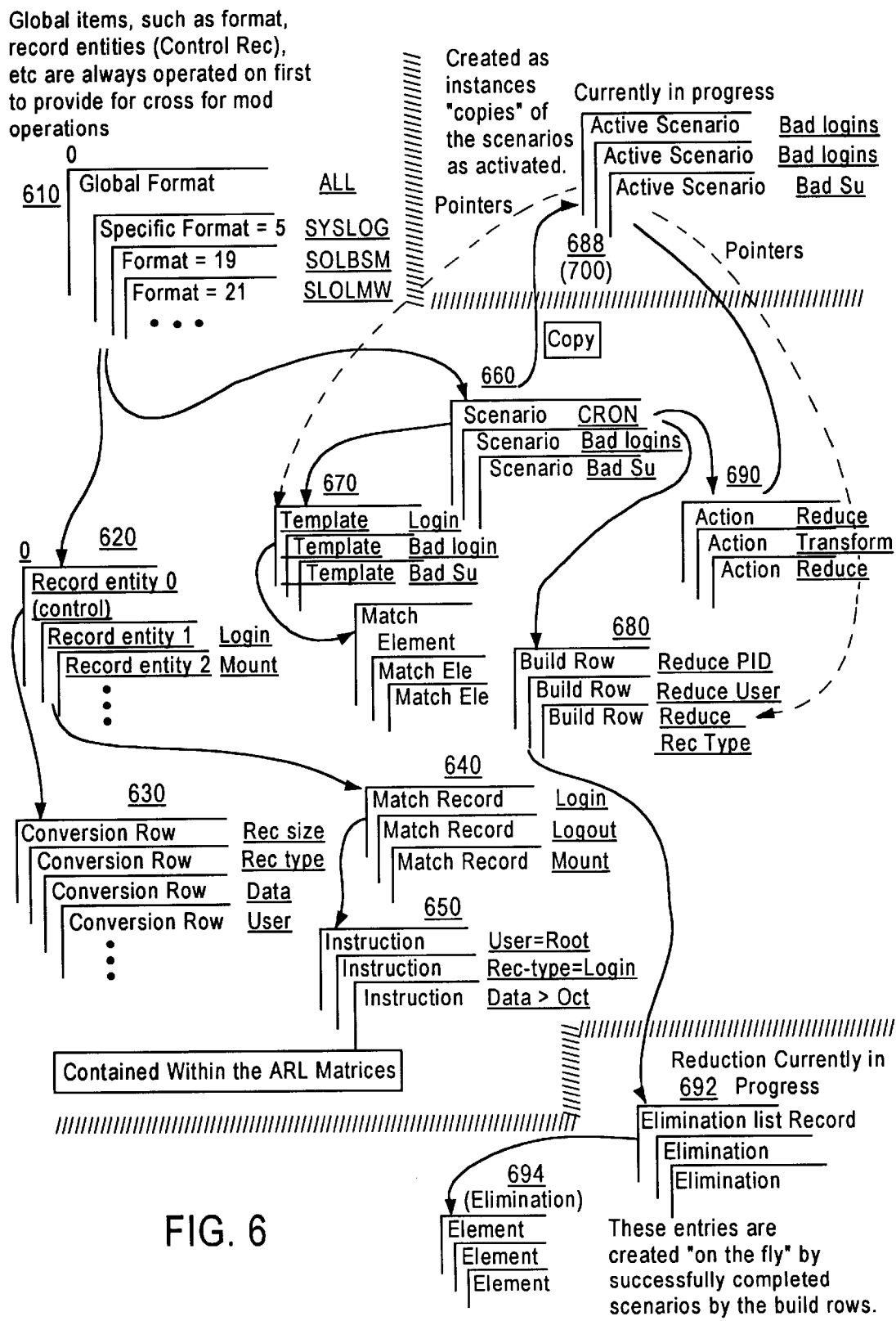
FIG. 6 is an illustration of a matrix of templates.

After the record has been compared against the global format and an output format determined, then the record is compared against a set of tables called record entity tables (see FIG. 6). As depicted in FIG. 6, global items, such as format, record entities (control REC), and the like are always operated on first to provide for cross format operations. There are specific formats, for example, format 5 may be for system logins (syslog). Another format might be format 19 for SOLBSM. Another format is format 21 for SLOLMW. From the global format at 610, the process continues to 620 in which each record entity is provided with a number. A matrix is provided at 630 for conversion rows. For example, REC record size, record type, date and user, and so forth. A matrix at 640 includes templates for matching records for logins, logouts and mounts. A matrix is provided at 650 which includes instructions for user equal route, record type equal login and date greater than a certain date such as October. A scenario matrix is provided at 660 which can be a chronological matrix, a bad logins matrix and a bad super-user scenario. At 670, a template matrix is provided which might include a login template, bad login template and a bad super-user template. At 680, a build row template is provided which might include a reduced PID build row template, reduce user build row template and a reduce record-type build row template. At 690, an action template is provided which could either be reduce, transform or reduce. At 700, various scenarios are created as instances or "copies" of the scenarios already activated. There are various scenarios that might be currently in progress such as a three bad logins scenario, three bad logins on JHW's computer, three bad logins on WAC's computer or a bad super-user (SU). There are various pointers denoted by dashed lines which are used based on the scenarios for the template matrix 670, the build row template 680, and the action template 690. If a reduction is currently in progress at 692, there is an elimination list of matrix. These lists where entries are created "on the fly" by successfully completed scenarios by the build rows. At 694, there is an elimination matrix which includes certain elements which were previously audit records.

The audit agent 310 starts going through these record entities tables and tries to identify the record typically based on the primary discriminator. For example, in this simplistic view, if the primary discriminator includes a 6 (see FIG. 5A), then a record entity corresponding to a record type=6 is activated. This identifies the record. There is an action associated with the identification of the record.

The action illustrated in FIG. 6 is a decision whether to reduce the record (throw the record out) from further consideration or normalize the record into a standardized format and then to save the record for further analysis by the intrusion and misuse detection engine. There are three types of reductions: simple-simple, simple-complex, and complex-complex. Simple-simple means one record is compared and interpreted against one template. Simple-complex means one record is compared and interpreted against many templates, but it takes only one record to move from a comparison phase state to an interpretation phase. Complex-complex means many records are compared and interpreted against many templates.

In a simple-simple reduction, the record is reviewed against a single record entity or template, and either there is a conversion, or the record is reduced out. If reduced, the record is not converted to another format but is sent to the on-line audit file storage device 350. Then the next record is analyzed.

Reduction occurs in two phases: comparison (to see if something has happened) and interpretation (do something about it). To connect records that are somehow associated, the software uses defined fields as linkage fields. Linkage fields can include the process identifier (PID) (linkage or grouping by process), user identifier (UID) (linkage by user), etc. For example, the information contained in field C could be the linkage field. All record-type=6 records are operated on through the linkage field. In this example, all the record-type=6 records that have a matching port ID or processing ID are matched for that record and then all the subsequent records that match that record are reduced out. For example, all records having a record-type=6 in field B and an 8 in field C (8 representing the matching part or processing ID).

In a complex-complex reduction, one record entity might find a match for a record-type=6 and if field C contains an 8, there is a whole series of records to match. In this example, the audit agent may search for another record that has a record-type=6, and so forth. Additional pattern matching could be required.

A simple-complex reduction is depicted in FIG. 7B in which a record-type=6 in field B and a PID of 1234 in field E is compared against a template in the comparison phase. In the interpretation phase all records with a PID of 1234 are compared against an elimination list.

A complex-complex reduction is depicted in FIG. 7C in which once a record having a record-type=6 in field B and a PID=1234 in field E is located in the comparison phase, all subsequent records having record-types equal to either 6 or 8 are compared against all records with a PID=1234 during the interpretation phase.

In FIG. 7D, a flow diagram of the steps of FIG. 6 is illustrated. In step 610, incoming audit records are received. At step 620, an audit record is in the view and each of the audit records is matched against templates and elimination lists to determine if each audit record is to be reduced or further processed. If the audit record is marked for reduction at step 630 then, at step 640, the record is copied for an in progress active scenario (in case scenario fails) as discussed in detail below. At step 650, the audit record is either reduced or sent for conversion.

Actions can be taken depending on the matching based on the fact that the audit agent 310 failed or succeeded in finding a match. For example, a match may be expected such as in a financial transaction where a certificate is provided. If a certificate is provided, the records should be in a certain order or the fields in certain records should contain certain information, then the system may generate an alert that this certificate is not adhering to the standard methodology for a certificate. Another example is logins and logouts. For example, if record-type=6 in one record and then record-type=6 in another record for one computer on the network, this means this is a login (record-type=4) and this is a logout (record-type=6) and there is over twenty-four hours in between these two records, the audit agent 310 an alert may be provided because one machine can not be logged on for twenty-four hours, so that means that the user left their machine logged on. This is a potential security breach because a misuser could be using the logged on computer. In a complex-complex situation, a record may be matched against hundreds and hundreds of templates and different fields from each record compared against different templates. One match may cause additional matching operations to be performed.

An example of a simple-complex reduction includes successful logins on a SUN Solaris 2.5 system. With all audits enabled, the system will generate about 150 audit events—all considered normal activity. Using the simple-complex methodology, a scenario would become active at the receipt of a record with a record-type of 4 (Example) subsequently an elimination list entry is build to reduce out the 149 subsequent audits based on the PID linkage field. The initial record generates the login output record. An example of a complex-complex scenario includes the tracking of user operations to ensure that the sequence is completed correctly. In this application of the technology it is necessary to step through the sequence of records while in the comparison phase to identify if the user actions occurred correctly. Some records are necessary to the completion of the scenario but some intermixed (within the linkage constraints) records may be ignored. All comparisons in the template list must succeed prior to switching to the interpretive phase.

Specifically, the analysis of a chronology (cron) job scenario requires a complex-complex definition. First, the system must detect a login event. Then a number of activities occur associated with the system starting the job, i.e., the generation of a shell, the reading of the even tab file.

In summary, the audit agent 310 performs a first line analysis and reduces the audit records to be output and then outputs the audit records. The audit agent can also wait for additional records. The analyzed, reduced and transformed data is then output to audit analysis database storage device 360. This data can then be further analyzed by the intrusion and misuse detection engine disclosed in a patent application entitled "Method and System for Detecting Intrusion into and Misuse of a Data Processing System" assigned to the instant assignee and filed on even date herewith and incorporated by reference into this specification in its entirety.

Figure 8:
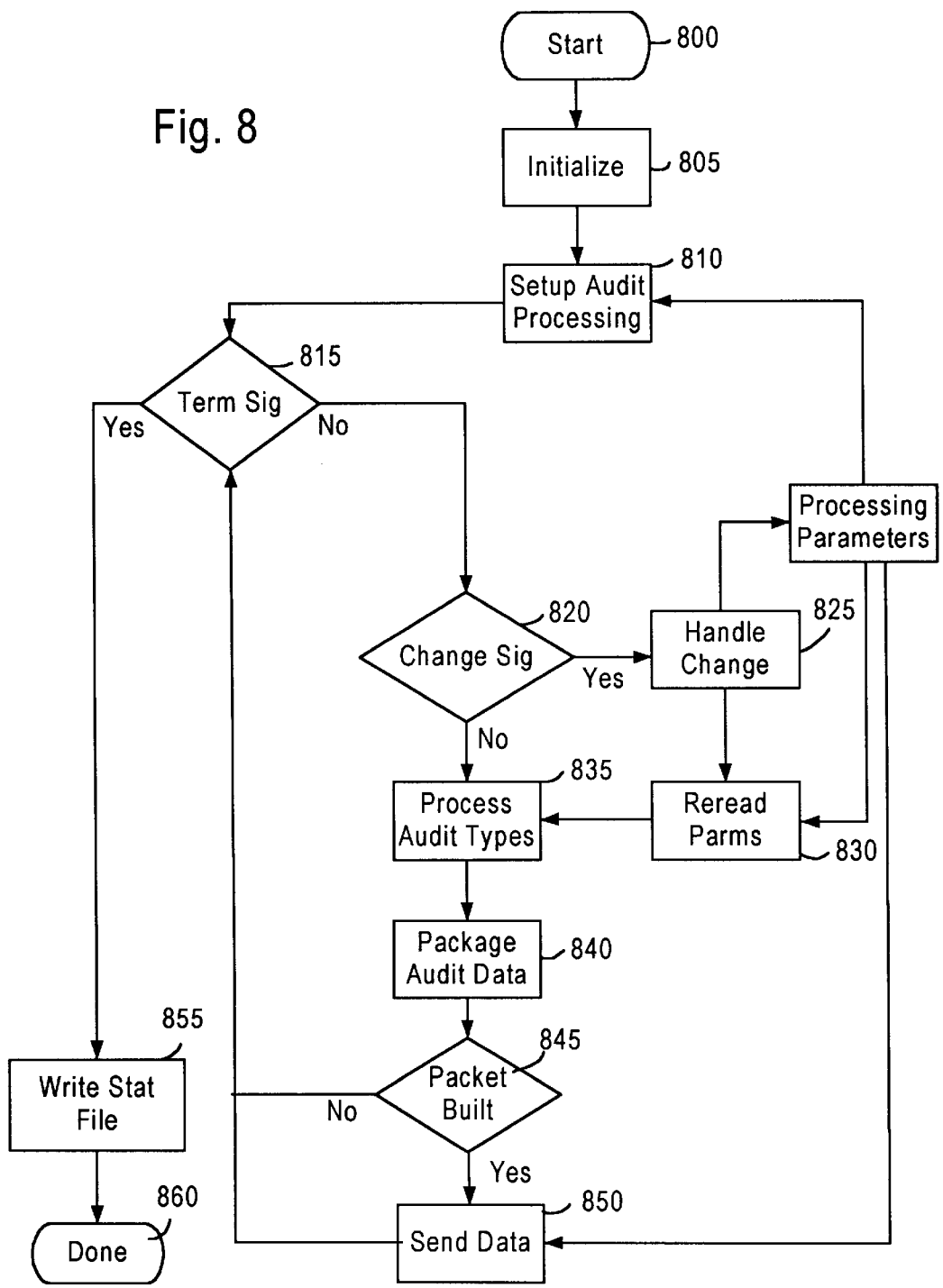
FIGS. 8–39 are flow diagrams of the process used for analyzing and reducing audit trail records from heterogeneous sources according to the present invention.
Figure 9:
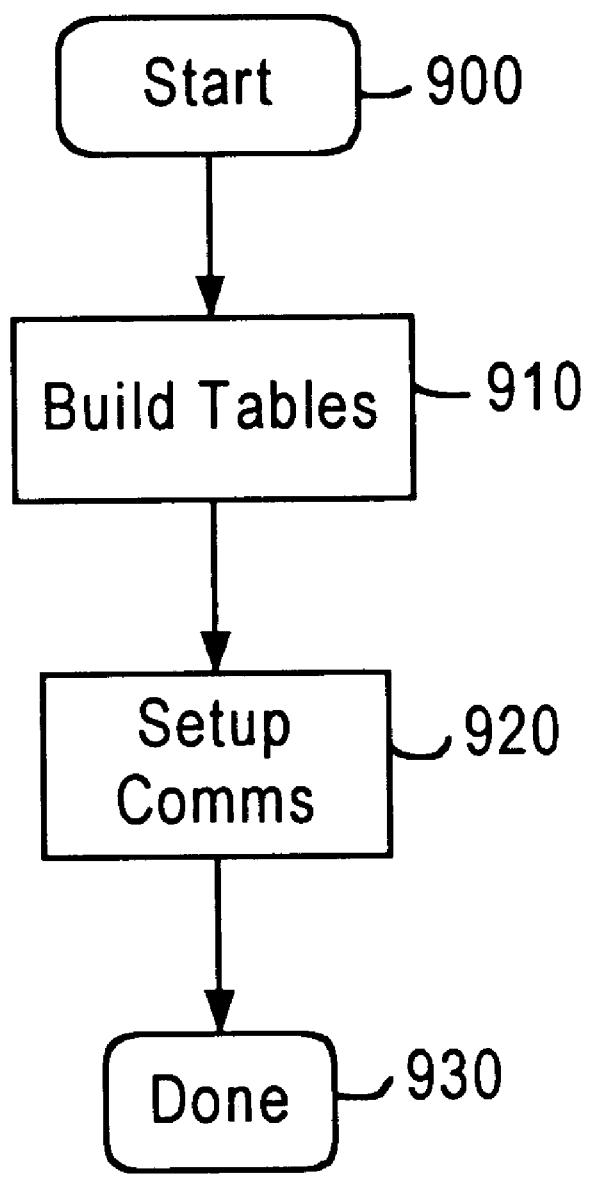

With this brief overview in mind, the details of the present invention can be understood with reference to FIG. 8 where a top-level flowchart is depicted according to the present invention. The flowcharts illustrated in FIGS. 9–39 are details of the steps in FIG. 8. At step 800 in FIG. 8 the process is started. At step 805, the process is initialized. The initializing step is illustrated in greater detail in FIG. 9. At step 910, in FIG. 9, tables are built, by setting up, for each format (positional and contextual), the five matrices 500, 510, 520, 530, 540 discussed above with respect to FIG. 4. At step 920, communications are set up by initializing any sockets, etc. All the matrices are populated within the address space, so now the instructions are available for the audit agent 310 to start processing. At step 930, the initializing step 805 is complete and the process proceeds to the sets up audit processing step 810 in FIG. 8.

Figure 10:
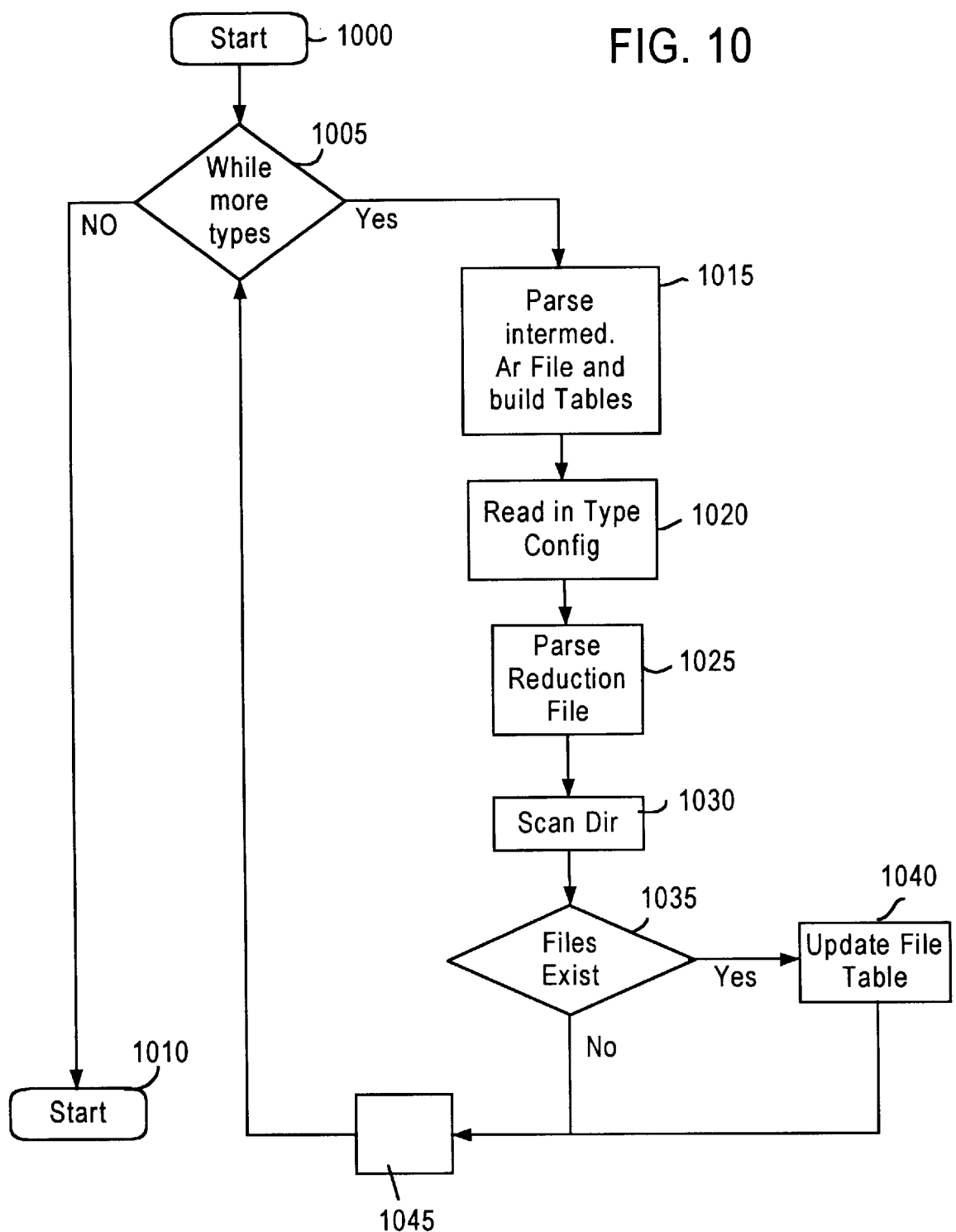
Figure 11:
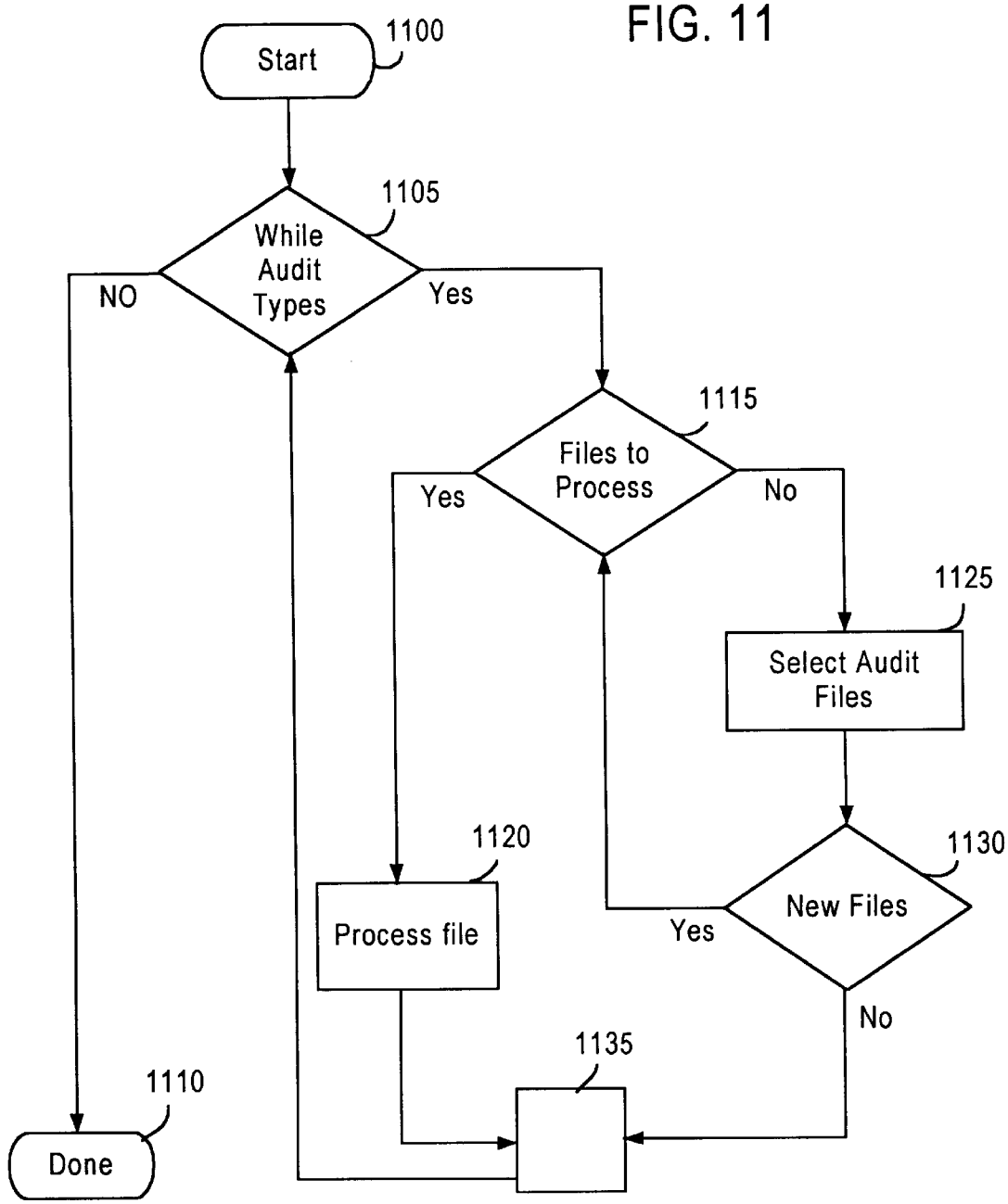

The set up audit processing step 810 is illustrated in detail in FIG. 10 and at step 1000 the process is started. At step 1005, the audit agent 310 decides whether to wait for additional format types. For example, there may be one or more audit types that are positionally based, and one or more audit types that are contextually based. If there are no more types to wait for, at step 1010, the set up audit processing step 810 is complete. At step 1015, the audit agent parses an intermediate audit reduction (AR) file, and builds tables. A file is created that allows the audit agent 310 to make temporary changes to the file without making permanent changes. At step 1020, the configuration of the record is read and the type of configuration is determined, based on the environment constraints 500. The environment constraints 500 is used to determine where the record comes from. At step 1025, a parse reduction file can be set up although it is not necessary. At step 1030, a scan directory step provides information regarding the location of the audit files. For example, the audit files may be sent by the audit agent 310 in real time or may be extracted from the on-line audit files database 350. At step 1035, it is determined whether any audit files exist. If there are audit files, then at step 1040, the file table is updated. Otherwise at step 1045 the system returns to step 1005. When all of the types of records have been set up, the set up processing step is completed at step

1010. This set up audit processing step 810 is performed for all the different format types that are going to be processed.

Returning to FIG. 8 at step 815, there is check for a terminate signal from the server or alert monitor tool 380 to shut down. At step 820, there is check for any change signals to change the current configuration. A change signal would be sent from the anomaly reporting tool 410. At step 825, if there is a change request, changes are made to the tables and so forth.

At step 835, the process audit types step is begun. Step 835 is conducted sequentially for each audit type. The process audit types step 835 is illustrated in detail in FIG. 11 and at step 1100 the process is started. At step 1105, the audit type is checked. At step 1110, if there are no files to process then the process audit types step is complete. At step 1115, it is determined whether there are any files to process. At step 1120, if there are files to process then the files are processed and after the files are processed the process continues to step 1135. At step 1125, audit files are selected based on criteria. The criteria includes a time range as well as a naming convention for the current source. At step 1130, once files have been selected the process returns to step 1115. If there are no new files, then the process proceeds to step 1135. Step 1135 returns the process to step 1105.

Figure 12:
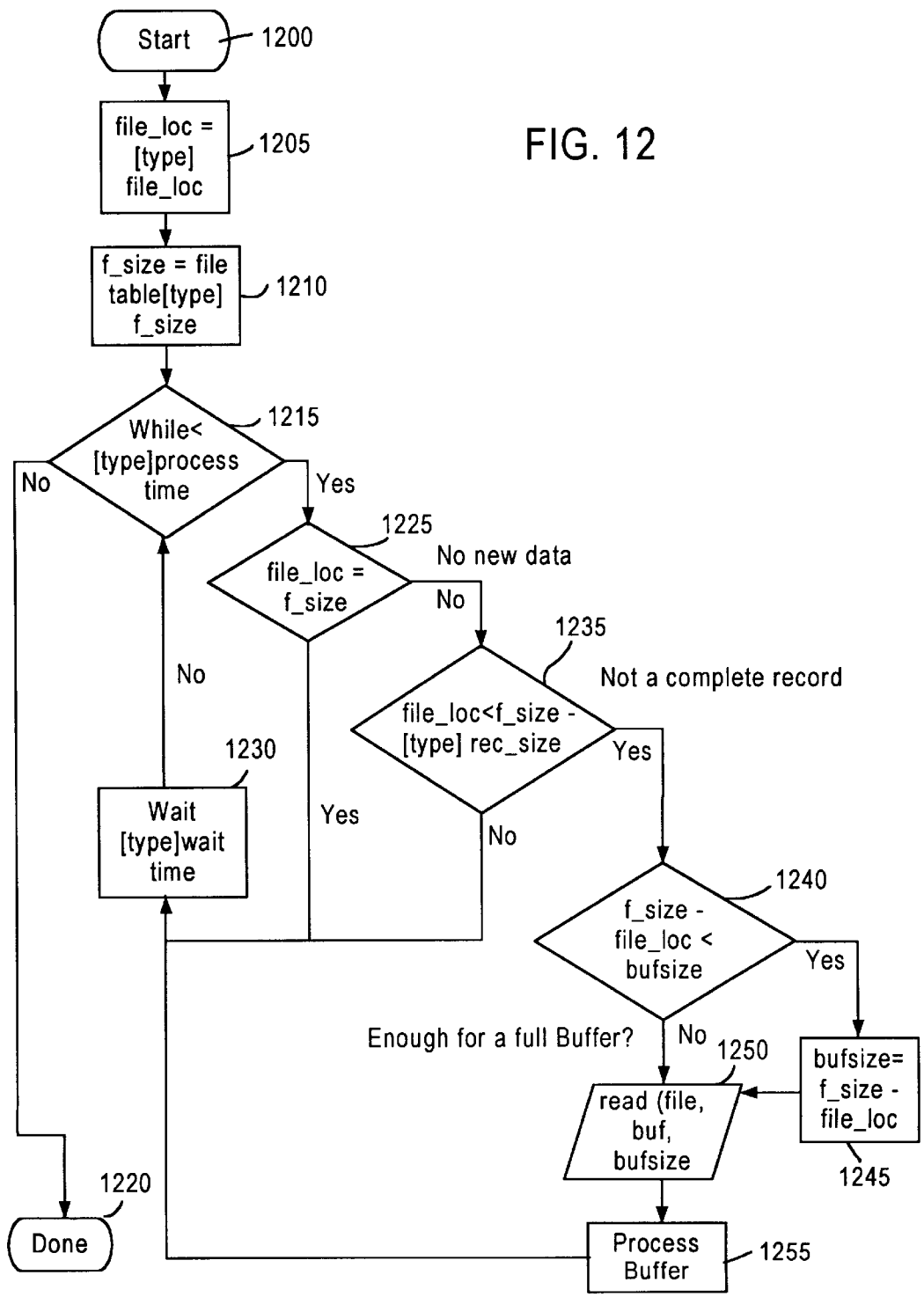

The process file step 1120 is illustrated in greater detail in FIG. 12. At step 1200, the process file step 1120 is started. At step 1205, the programmer use file location is checked against a type equals file location to see if this is an open file. At step 1210, the file is checked to see if has been previously processed, and if any new data has been added to this file. At step 1215, the amount of process time for the file is checked and if it exceeds a predetermined amount of time, then at step 1220, the process is completed. At step 1225, the file location is checked against file size. If the file location equals file size no new data has been added to that particular record and the process proceeds to step 1230. If the file location does not equal the file size, then at step 1235, this means that the operating system has only written a partial record. At step 1240, if the file size minus the file location size is less than a buffer size then additional records can be added to the buffer until, at step 1245, there is a full buffer. The buffer includes a plurality of records forming a portion of a file. At step 1250, the file buffer size is read and then at step 1255 the process buffer step 1255 is started. Step 1255 loops back to step 1230 and then to step 1215 until all of the records have been read.

Figure 13:
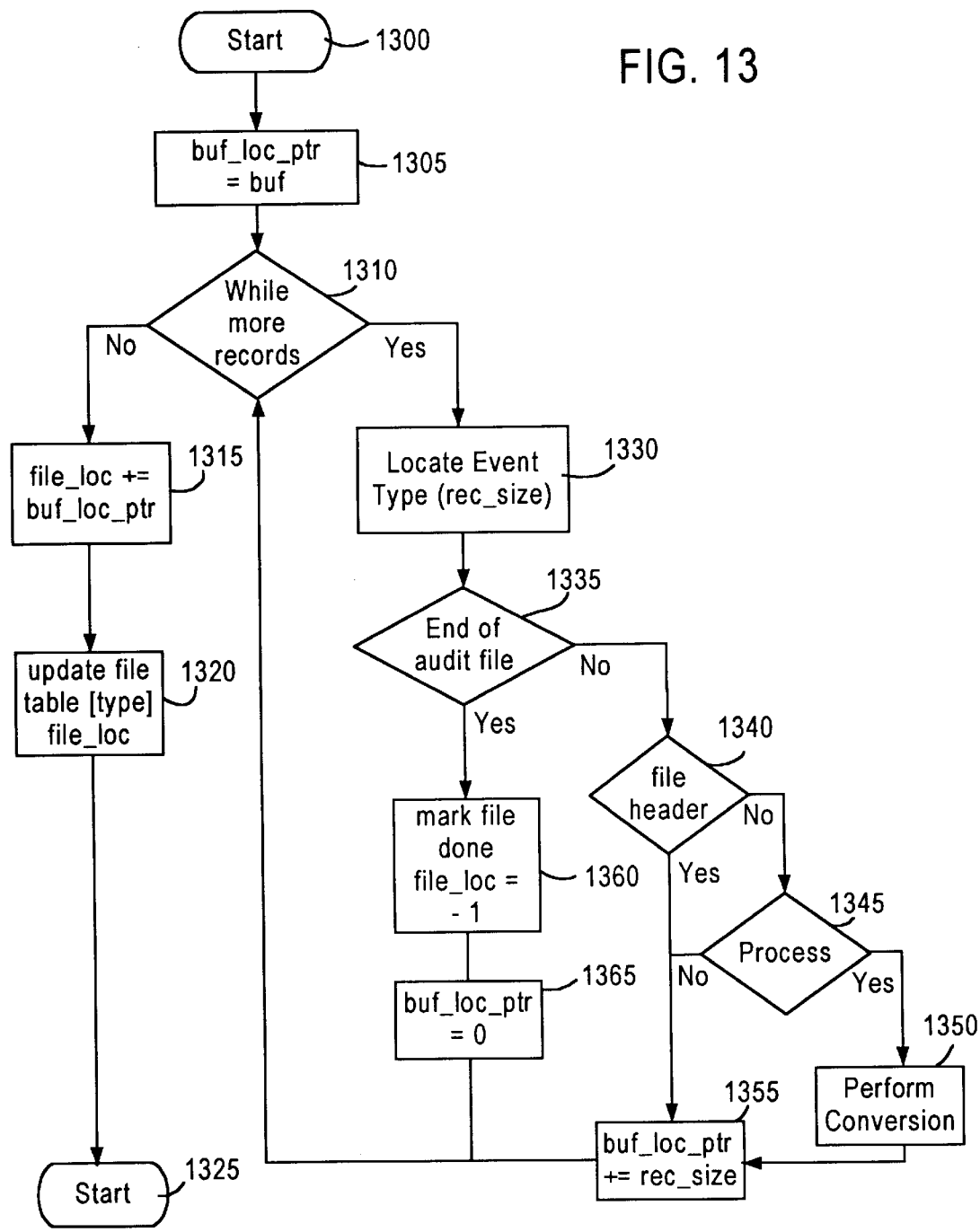

The process buffer step 1255 is illustrated in greater detail in FIG. 13. At step 1300 the process buffer step is started. At step 1305, a pointer is set to the beginning of the buffer. The pointer advances as it goes through the buffer and identifies records. At step 1310 the process waits for more records. If there are no more records, at step 1315 the file location is equal to buffer location pointer. At step 1320 the file table is updated and at step 1325 the process waits until the next cycle.

At step 1330, if there are additional records, the additional records are identified and the record size determined. At step 1335, if there are no more records (end of the audit file) the process proceeds on to step 1360 where the file is marked, and the buffer location pointer is set to zero at step 1365. If it is not the end of the audit file, at step 1335, the process checks for a file header at step 1340. If there is no file header, at step 1340, it must be determined, at step 1345, whether to perform further processing, meaning whether to convert the record to a standardized format or to reduce the record out by advancing the buffer at step 1355. At step 1350, the conversion is performed which is discussed in greater detail below.

Figure 14:
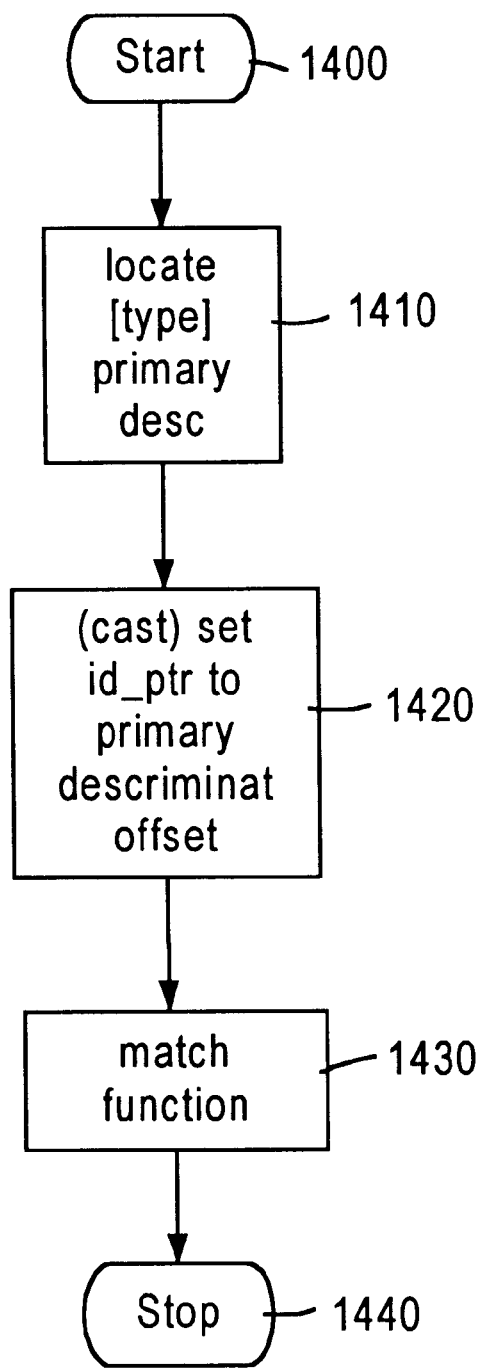

FIG. 14 is the locate event type flow chart. At step 1400 the process is started. At step 1410 the primary discriminator is located. At step 1420 the ID pointer is set to a primary discriminator offset. The primary discriminator (PD) performs the grossest level of filtering. It provides for a rapid narrowing of potential rules for the process to check against. Similar in concept to a sort, i.e., if the PD is "X" and only four rules apply to a record with a PD of "X" the processing can be saved of rules for PDs of "Y", "Z", and "A" because they can't apply. The PD offset tells the process where to find the PD within the record (it varies depending on the format, and in certain cases doesn't exist). At step 1430, the match function is performed and at step 1440, the process is complete.

Figure 15:
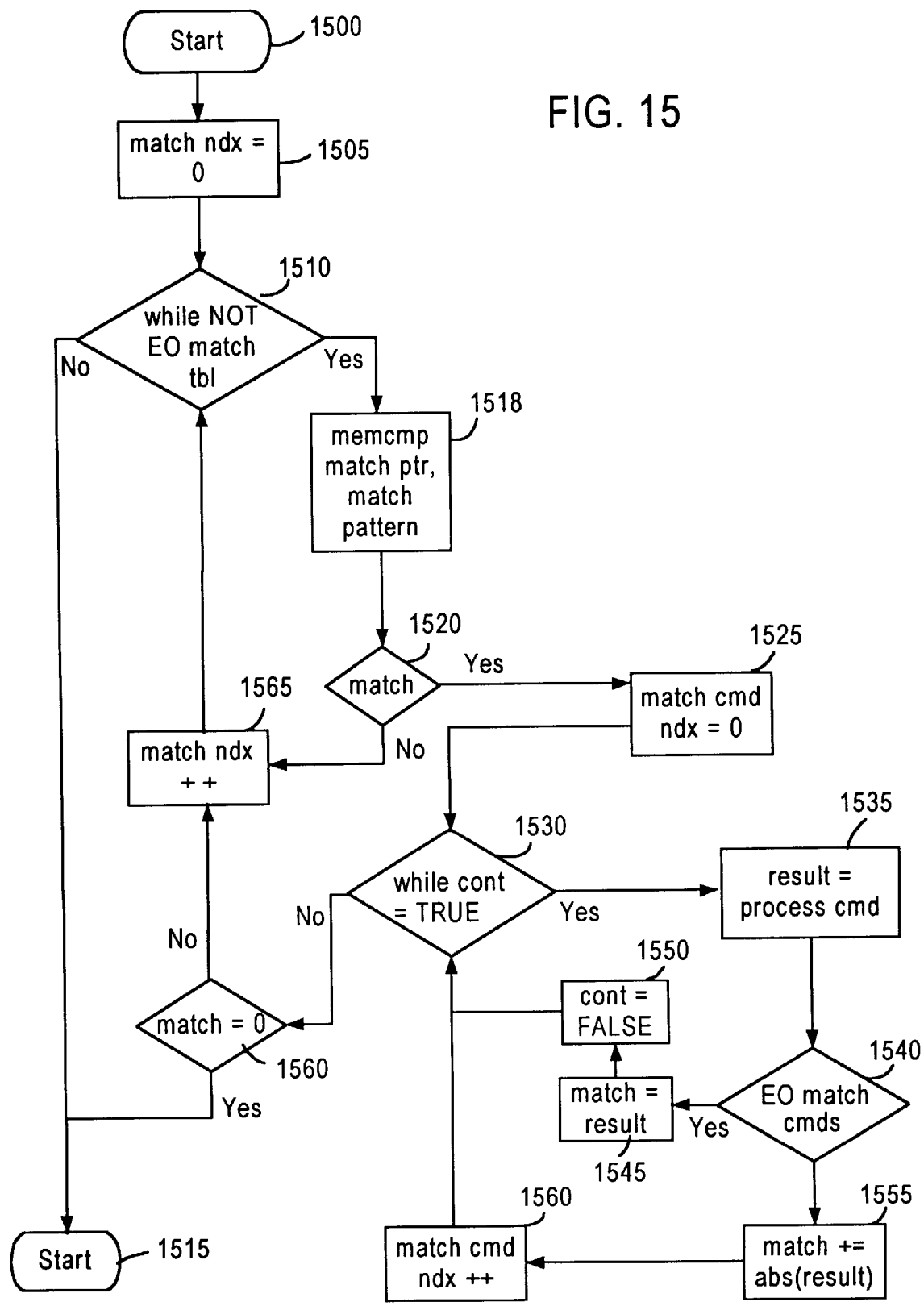

The match function step 1430 is illustrated in greater detail in FIG. 15. At step 1500 the match function step is started. At step 1505, the match index is set to zero meaning that the process starts with the first match record. Records that are matched need to be checked again for additional matches. At step 1505, the process is set to the beginning of a match table. At step 1510, the process looks for the end of the match table and checks for the end of file. As previously mentioned above with respect to step 1410, the primary discriminator has already been identified. The match function is a table in which is stored the particular templates that a record should be compared against based on the primary discriminator. This is the same as the records entity templates of FIG. 5). Once the process reaches the end of file, the process exits at step 1515. If the process is not at the end of the match table, then processing is continued at step 1518. At step 1520, there is a binary comparison of two memory locations to determine if there is a match between the two values. This can be two values in two fields or one value in the record and the other value in the template. If there is not a match at step 1520, then the pointer is advanced in the match table and the process goes on to the next match record at step 1565. At step 1520, if there is a match, at step 1525 the match command is set to zero. Match commands are the "holes" in the templates, i.e., how to conduct the match. A match command table is another table that is a sub grouping of instructions from the original match table. At step 1530, using the match command table, it is determined if the pointer is at the end of the table. If there are additional templates to compare then the process proceeds to step 1535. If the match is equal to zero at step 1560 then there are no more matches. There was at least previous one match for the primary discriminator but not using any of the additional templates. If there are additional matches, at step 1535 then the process proceeds to step 1540, and more match commands are provided if there is a positive match result at step 1545. The match result is produced at step 1545 and at step 1550 the pointer is set to continual and then the process exits out at step 1530. If the process is not at the end of the match command, at step 1530, the absolute value of the match is taken which is always expected to be positive if it is successful. Commands can be successful if the command fails. The audit reduction agent 310 requires a positive return from each command processed, otherwise the match fails. However, in certain cases, negative logic is used (i.e., if something is not equal or fails to match). The expected state is present so that when a failure is expected and one is obtained, this is considered success. The match command is incremented at step 1560 and this loop is continued until all the match commands for this match record have been checked. Depending on the match obtained at step 1560, then at step 1565 it is determined whether to continue with the additional match records or exit.

Figure 16:
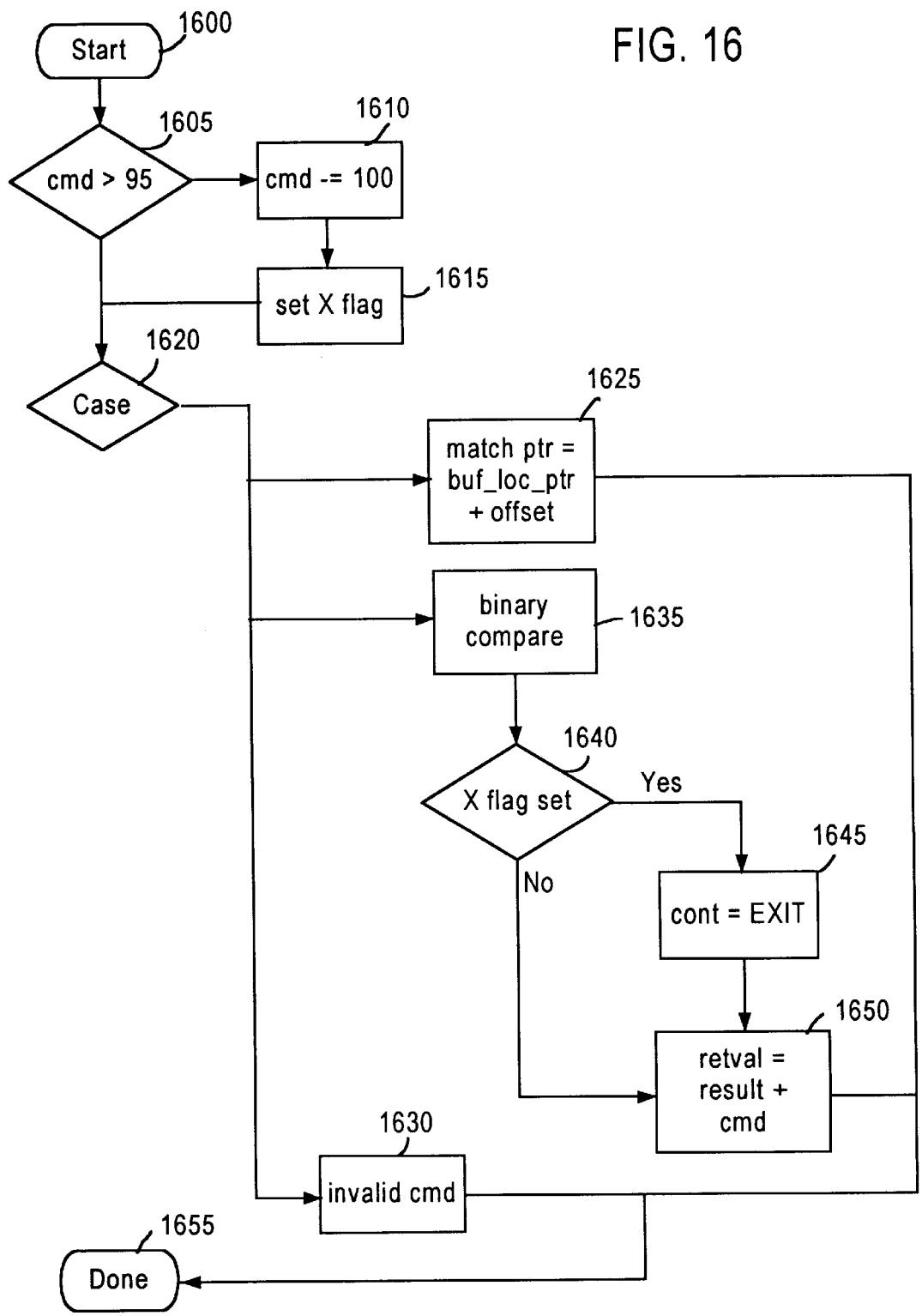

The process command step 1535 is illustrated in greater detail in FIG. 16. At step 1600 the process command step is started. At step, 1605 an arbitrary command is checked to see if it is greater than 95. If the command is greater than 95, then it is considered conditional. The process is checking here to see if there is an exit or fault command. At step 1610, the process checks to see if the command is less than 100 and an X flag is set at step 1615. At step 1620 there are cases when it is desired that the result obtained returns false. At steps 1605–1615, if the command is greater than 95, the result is expected to be false. So a true is returned in that case. Processing can not continue unless a true is returned. These arbitrary values have to pre-set so that the process is successful in recognizing a false state. At step 1620 the case instructs the audit agent 310 to operate on any particular field within the data. This moves the pointer in the data to a new location. At step 1625, the match pointer is set equal to the buffer location pointer plus an offset to perform a comparison. At step 1635 a binary comparison occurs with the pointer being in the table. If the X flag is set in step 1615, then the X flag says that the process is supposed exit if this is true. A primary discriminator has been identified so the process has the functionality to create a program about how to continue to identify this record. The record or data can be compared to other data, pointers can be advanced to look for other values within the record and the process command takes what is written in the command table and executes the commands in the command table.

Step 1625 provides the ability to advance the pointer within the data and look at other fields besides the primary discriminator. The binary compare step 1635 can be used to compare a field of data against other fields of data in other databases. For example, the data could be contained within other tables, memory or even contained in interface 118. Step 1640 is a determination to set the X flag based on a set of conditions. The audit education agent 310 requires a positive return from each command processed, otherwise the match fails. However, in certain cases, negative logic is used (i.e., if something is not equal or fails to match). The expected state is present so that when a failure is expected, and one is obtained, this is considered success (X=exit on true). If certain conditions are met at step 1645, the process exits. If the conditions are not met at step 1650, a retrieval is obtained which equals the results plus a command which is a numeric value (command value numeric). At step 1655, the process exits. Step 1630 is an error handler for an unknown value.

Figure 17:
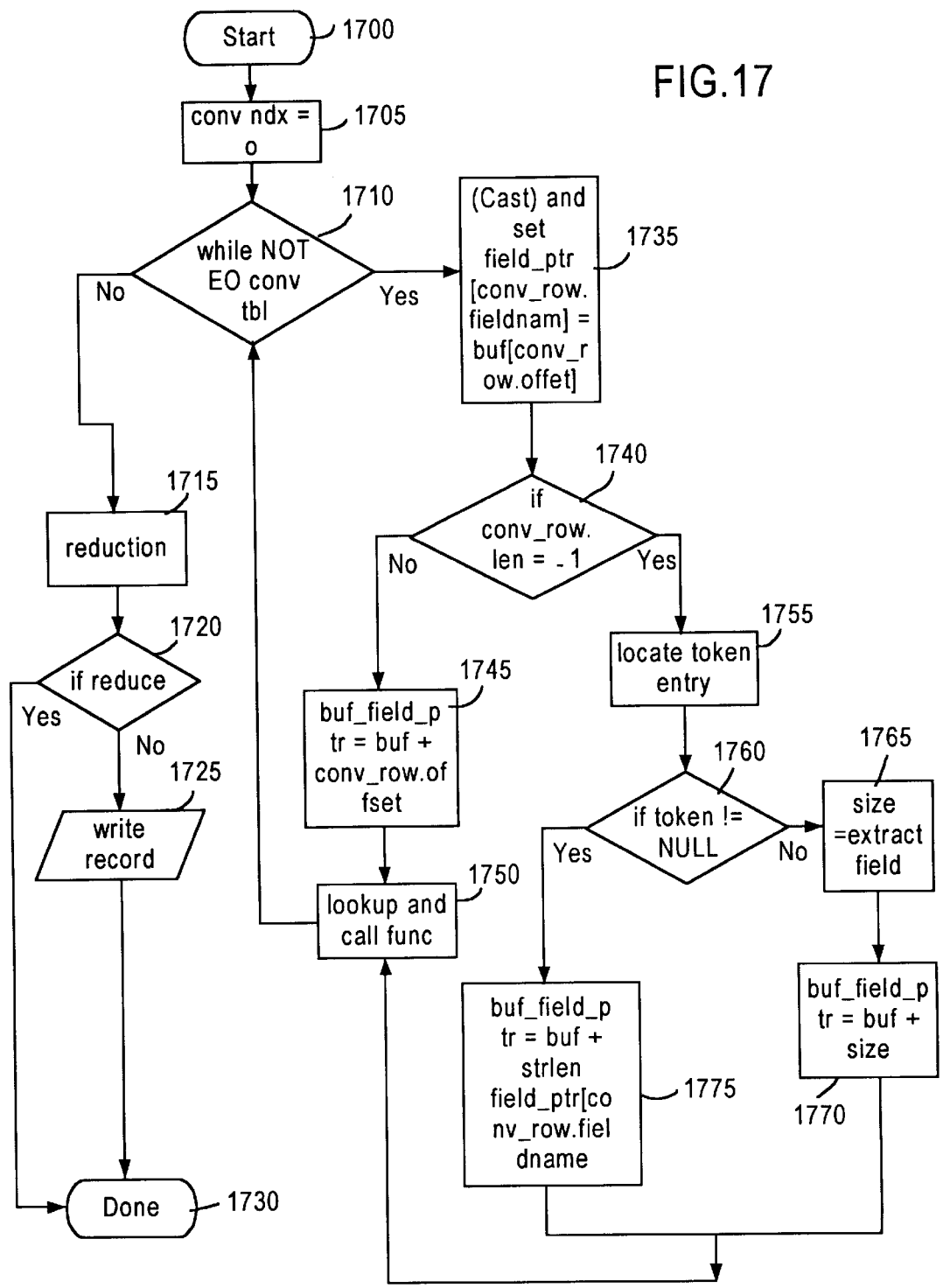

The perform conversion step 1350 in FIG. 13 is illustrated in greater detail in FIG. 17. At step 1700, the process is started and at step 1705, the conversion index is set to 0. At step 1710, conversion is performed until the end of table is reached or until a match is found. If no match is found, then at step 1715, the native audit is reduced. At step 1720, it is determined whether a reduction has been performed. If no reduction has been performed at step 1725, the record is written to native audit on-line audit file 350. If the reduction has occurred at step 1720, then the process is complete at step 1730. At step 1710, if the end of file has not been reached, at step 1735, a conversion row is started. There are 1 to N number of conversion rows. There is an input conversion row and an output conversion row which tells the audit agent 310 how to convert the data and where to put the converted data. At step 1740, if the length of the converted row is equal to −1, then the audit agent 310 does not know what the length of the converted record is. At step 1745, a delimiter is determined for that record. If the conversion row is equal to −1, then at step 1755, the token entry is located.

The token entry delimits the field definition. For example, it might be a colon, or some other type of data that provides information that the end of field has been reached. If there is no token as determined at step 1760, then at step 1765 and 1770, the length of the audit record is determined. At step 1775, if the token is null, then the string length is determined. Using either step 1770 or 1775, the string length can be determined and the amount of data limited. In either event, at step 1750, other codes are executed to perform specific conversion on the data. For example, there is a registered call back function which gets executed because the data is being converted from an input format to an output format. The process loops back to step 1710 until all the conversion rows and data have been converted. All the data will be mapped into the conversion table to be converted.

Figure 18:
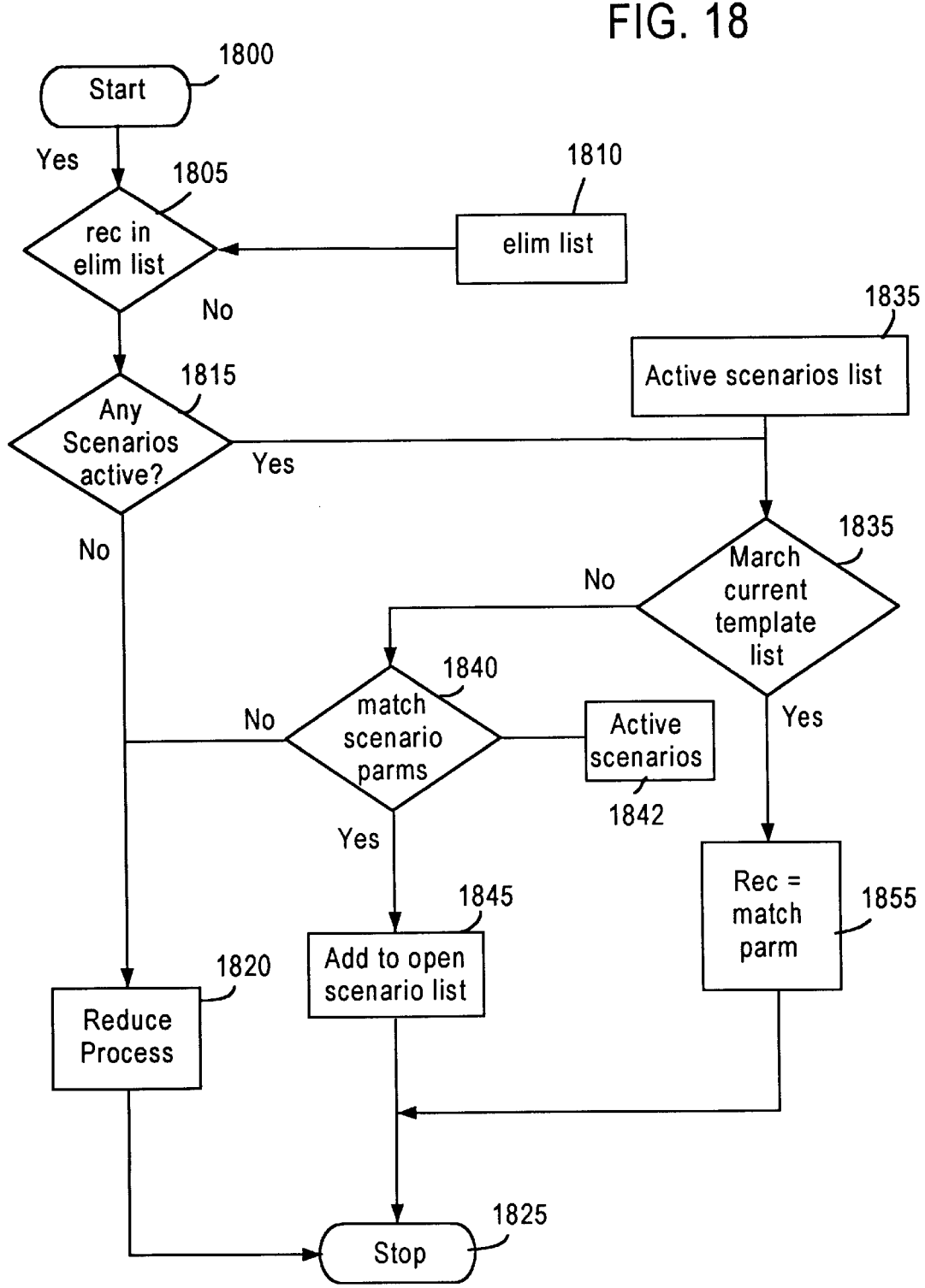

Reduction step 1715 is illustrated in greater detail in FIG. 18. At step 1800, the reduction step is started. At step 1805 there is a determination step to determine whether the record is in an elimination list 1810 by comparing the record against the elimination list 1810. The record is matched against every entry in the elimination list 1810. If the record matches any of the entries, the record will be reduced out. At the beginning, there are no active scenarios in the elimination list 1810. There are three lists of scenarios. The first is the list of possible scenarios that can happen as defined in the memory by the AR programmer. The second is a list of active scenarios in memory. This could include scenarios; for example, SC1–SC6, as depicted below. Because certain events have occurred in the audit stream (chronological audit data in order of generation), a scenario is said to be "in progress" or "active". This could include scenarios SC3, SC3, SC1, and SC6 as depicted below. This means the audit agent 310 will look for subsequent audit records (as matched against templates) as opposed to the already reviewed audit records.

Life cycle of a scenario:

| Can happen Possible Scenarios (as defined by the ARL Programmer) | Are happening In Progress Scenarios (Comparison Stage) Have Been Activated by Events | Have happened Elimination List Generated by Successful Scenarios to Reduce Out Additional Records |
| --- | --- | --- |
| SC1 | SC3 | SC3 PID = 21 |
| SC2 | SC3 | SC3 PID = 22 |
| SC3 | SC1 | SC3 PID = 23 |
| SC4 | SC6 | SC3A PID = 100 |
| SC5 | | SC3A PID = 101 |
| SC6 | | SC3A PID = 102 |
| Etc. | | SC1 |
| | | Etc. |

At step 1815, there is a determination as to whether there are any currently active scenarios. A scenario includes two or more identifiers within a record. When the audit agent first begins, there are no active scenarios in the elimination list but scenarios will be added as the process continues as discussed in detailed below. At step 1815, it is determined whether there are any active scenarios. An active scenario list is provided at 1835. How the active scenario list is created is discussed below. For the purposes of FIG. 18, it must be assumed that there are some active scenarios in list 1835. Step 1830 determines whether the record matches any current scenarios in the active scenario list. If there are no matches, then at step 1840, it should be determined whether to create new scenario parameters. This means that a new scenario is being added to the active scenario list 1835. If step 1830 is positive and matches located, then the record is compared against other templates. The active scenario list 1835 means that the scenarios are currently waiting for a record. For example, there may be thirty-two active scenarios, but the active scenario is waiting for a particular record. At step 1825, the reduction process is stopped.

Figure 19:
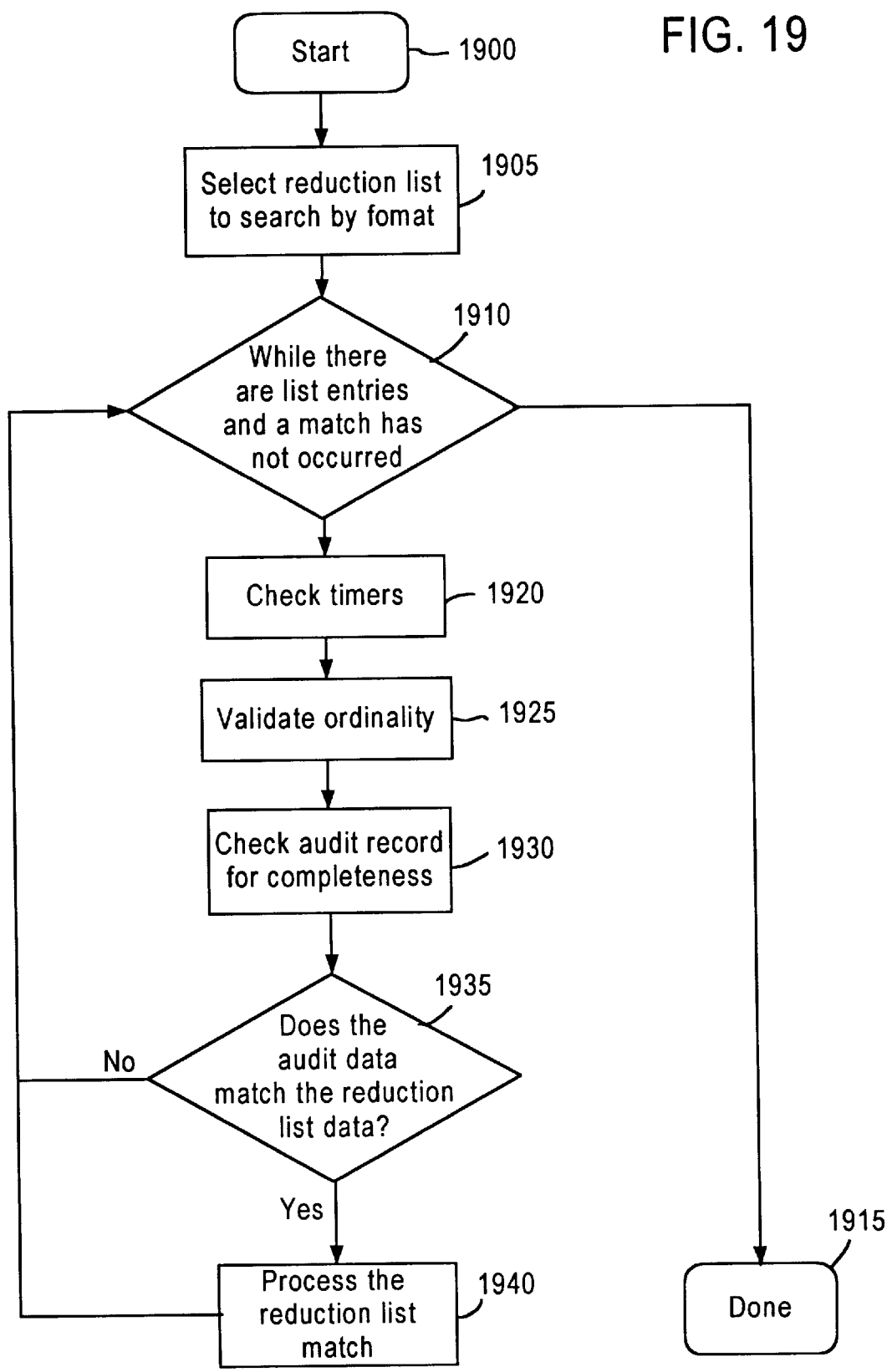

The record in elimination list step 1805 is illustrated in greater detail in FIG. 19. At step 1900, the process is started. At step 1905, the reduction list is selected to search by format. At step 1910, it is determined whether a match has occurred against a list of reduction entries. If no match has occurred, then the process is completed at step 1915. If the process is continuing to perform matches, then at step 1920, timers are checked. At step 1925, the ordinality is validated. Most comparisons and templates work on ordinality of "fields" (areas of data within a record). Step 1925 ensures pointers are at the appropriate location based on ordinality. At step 1930, the audit records are checked for completeness. At step 1935, it is determined whether the audit data matches the reduction list data. If the audit data does not match the reduction list data, then the process returns to step 1910. If the audit data does match the reduction list data, then at 1940, the reduction list match is processed.

Figure 20:
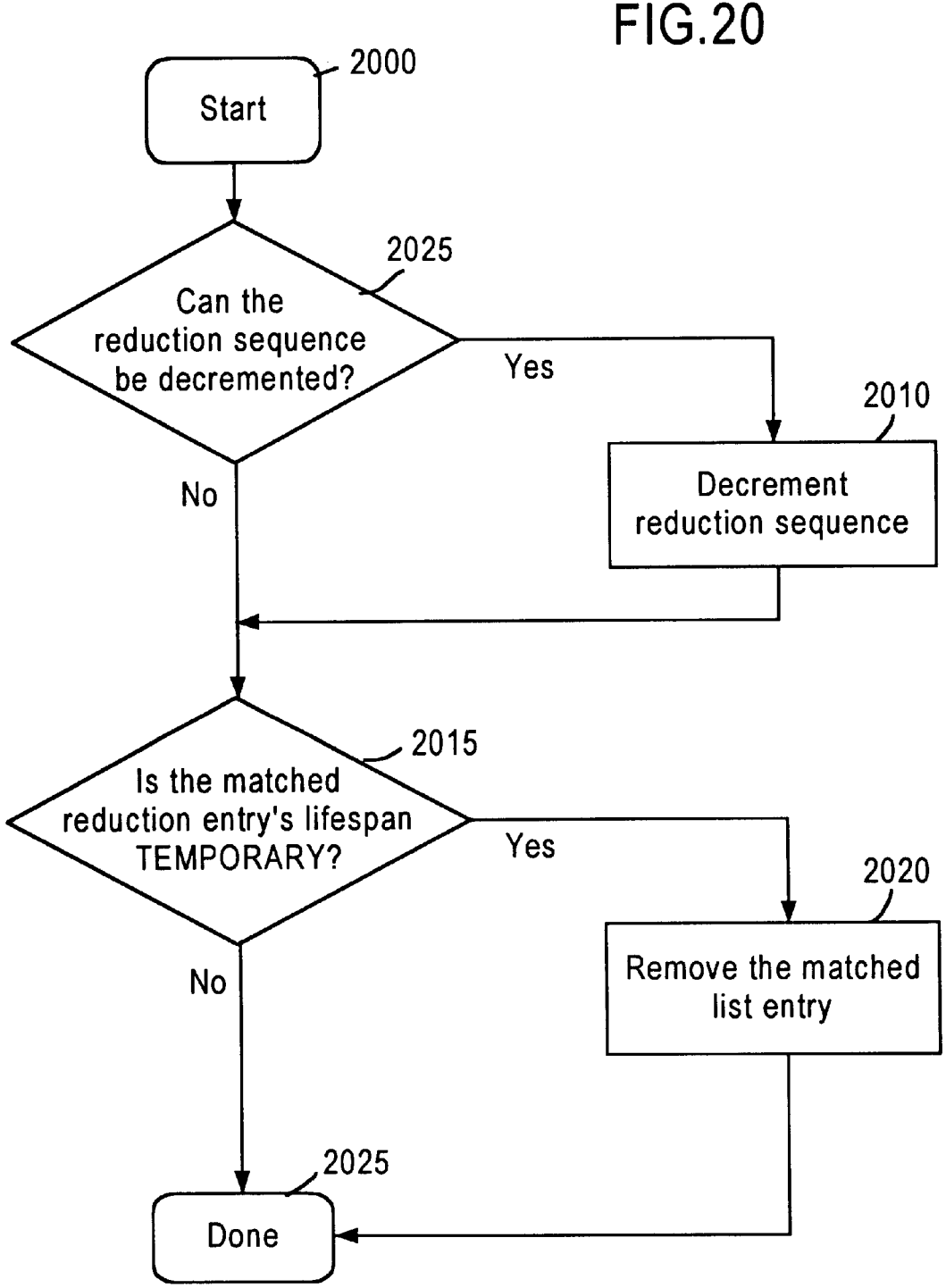

The processed reduction list match step 1940 is illustrated in greater detail in FIG. 20. At step 2000, the process is started. At step 2005, it is determined whether the reduction sequence could be decremented. A grouping of elimination list records which are associated—decrementing refers to the popping of a elim list record from the associated record "stack", i.e., making the next record in the sequence active. If the reduction sequence can be decremented, then at step 2010, the reduction sequence is decremented. If the reduction sequence can not be decremented, then at step 2015, it is determined whether the matched reduction entries life span is temporary. If the matched reduction entries life span is temporary, then at step 2020, the matched list entry is removed. At step 2025, the process is complete.

Figure 21:
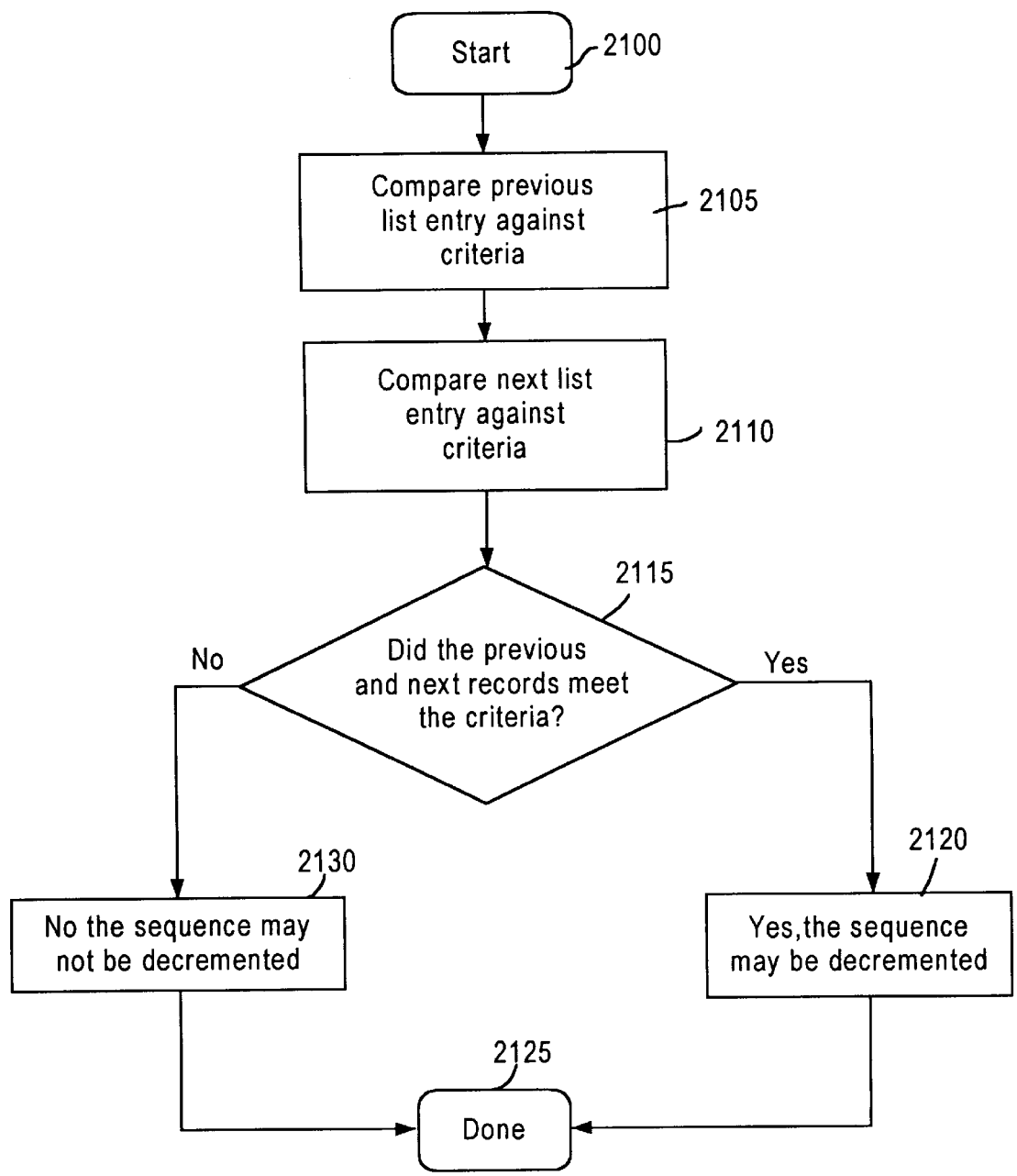

Determination step 2005 is illustrated in greater detail in FIG. 21. At step 2100, the process is started. At step 2105, the previous list entry is compared against criteria. Criteria can be any values, ranges, etc., based on scenario instructions. At step 2110, the next list entry is compared against criteria. At step 2115, it must be determined whether the previous and next records meet the criteria. If the previous and next records meet the criteria, then at step 2120, the sequence may be decremented. And at step 2125, the process is complete. If the previous and next records do not meet the criteria, then at step 2130, the sequence may not be decremented and process is completed at step 2125.

Figure 22:
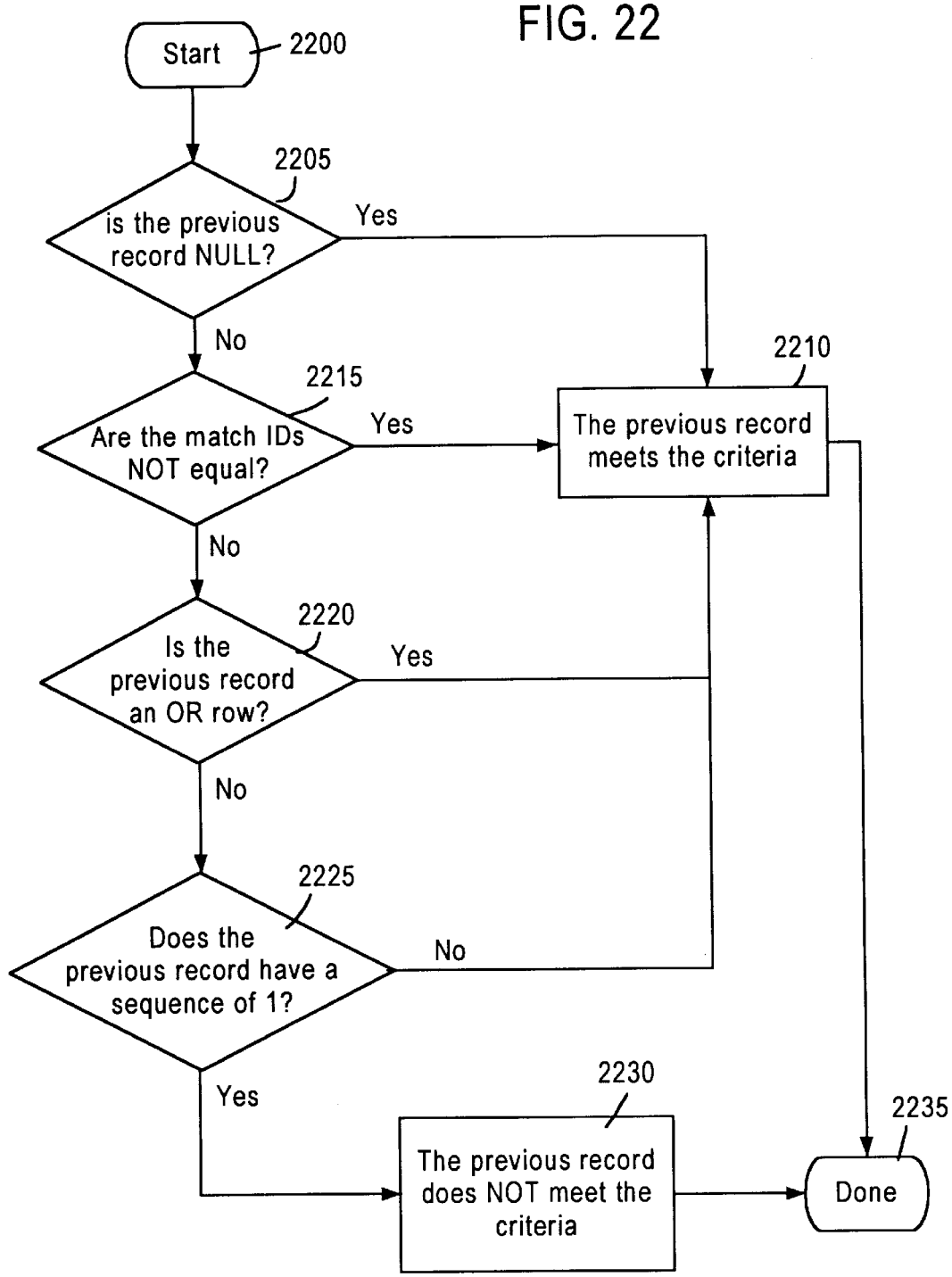

The compare previous list entry against criteria step 2105 is illustrated in greater detail in FIG. 22. At step 2200, the process is started. At step 2205, it is determined whether the previous record is null. If the previous record is null, then at step 2210, the previous record meets the criteria. If the previous record was not null, then at step 2215, it must be determined whether the matched IDs are equal. If the matched IDs are not equal, then the previous record meets the criteria at step 2210. If the previous record and/or row, then the previous record meets the criteria at step 2210. If the previous record and/or row is not determined, then at step 2225, it must be determined whether the previous record has a sequence of 1. If the previous record does not have a sequence of 1, then the previous record meets the criteria at step 2210. If the previous record does have a sequence of 1, then at step 2230, the previous record does not meet the criteria. From either step 2210 or 2230, the process proceeds to step 2235, where this portion of the process is complete.

Figure 23:
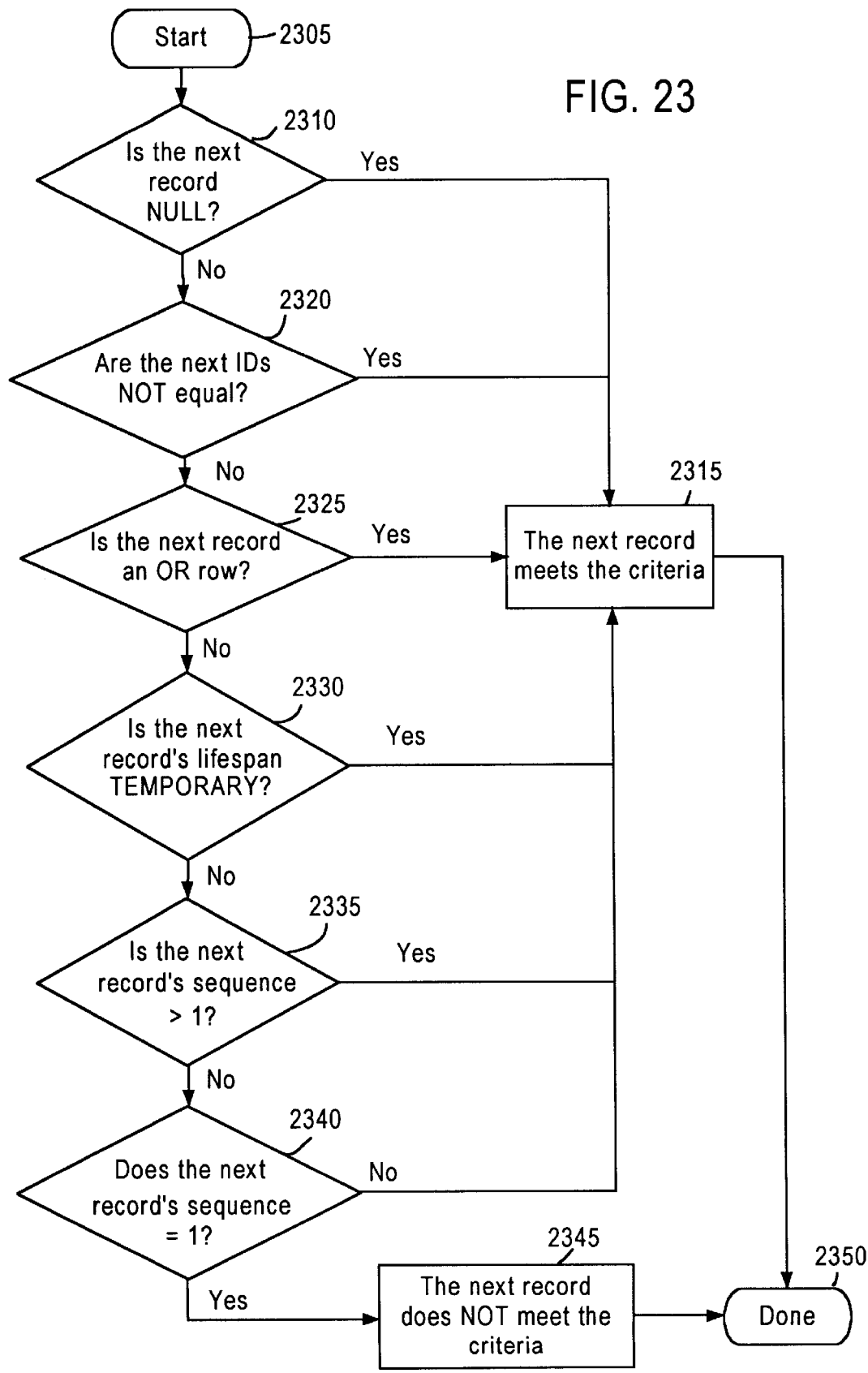

The compare next list entry against criteria step 2110 is illustrated in greater detail in FIG. 23. At step 2305, the process is started. At step 2310, it is determined whether the next record is null. If the next record is null, then at step 2315, the next record meets the criteria. If the next record is not null, it must be determined at step 2320, whether the matched IDs are not equal. If the matched IDs are not equal, then proceed to step 2315. If the match IDs are not equal, then at step 2325, it must be determined, is it the next record and/or row. If it is, then proceed to step 2315. If it is not, then step 2330 must be determined as the next record life span temporary. If it is, then proceed to step 2315. If it is not, then at step 2335, it must be determined whether the next record sequence is greater than 1. If it is, then proceed to step 2315. If it is not greater than 1, then at step 2340, it must be determined whether the next record sequence is equal to 1. If it is not, then the next record meets the criteria at step 2315. If it is, then at step 2345, the next record does not meet the criteria. From either step 2315 or 2345, the process proceeds to step 2350 where the process is complete.

Figure 24:
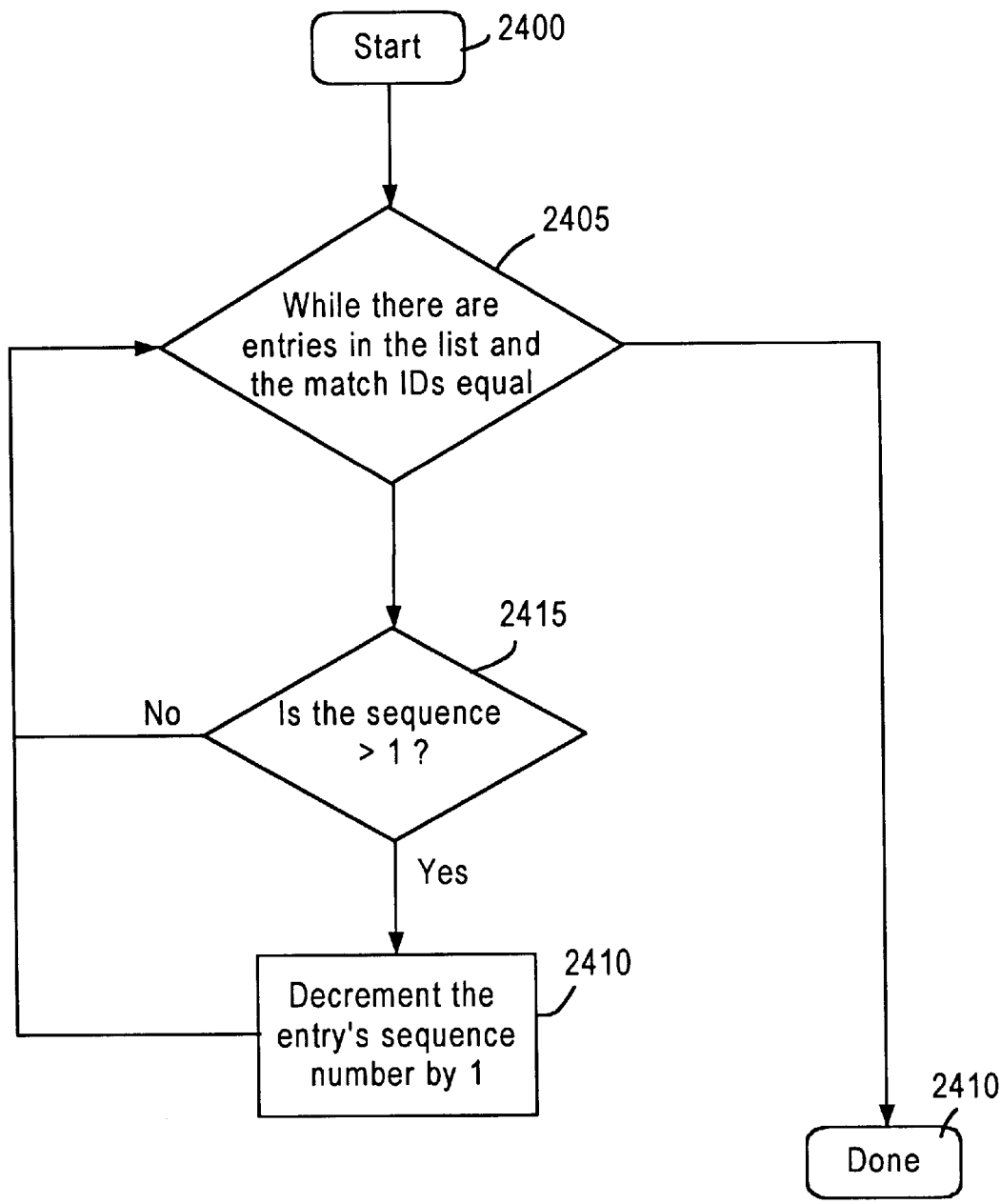

The decrement reduction sequence step 2120 is illustrated in greater detail in FIG. 24. At step 2400, the process is started. At step 2405, it must be determined whether there are entries in the list and the matched IDs that are equal. If there are none, then the process proceeds to step 2410 where the process is complete. If there are entries in the list and match IDs that are equal, then at step 2415 it must be determined whether the sequence is greater than 1. If the sequence is not greater than 1 then the process returns to step 2405. If the sequence is greater than 1, then at step 2420, the entries sequence number is decremented by 1. Then the process returns to step 2405.

Figure 25:
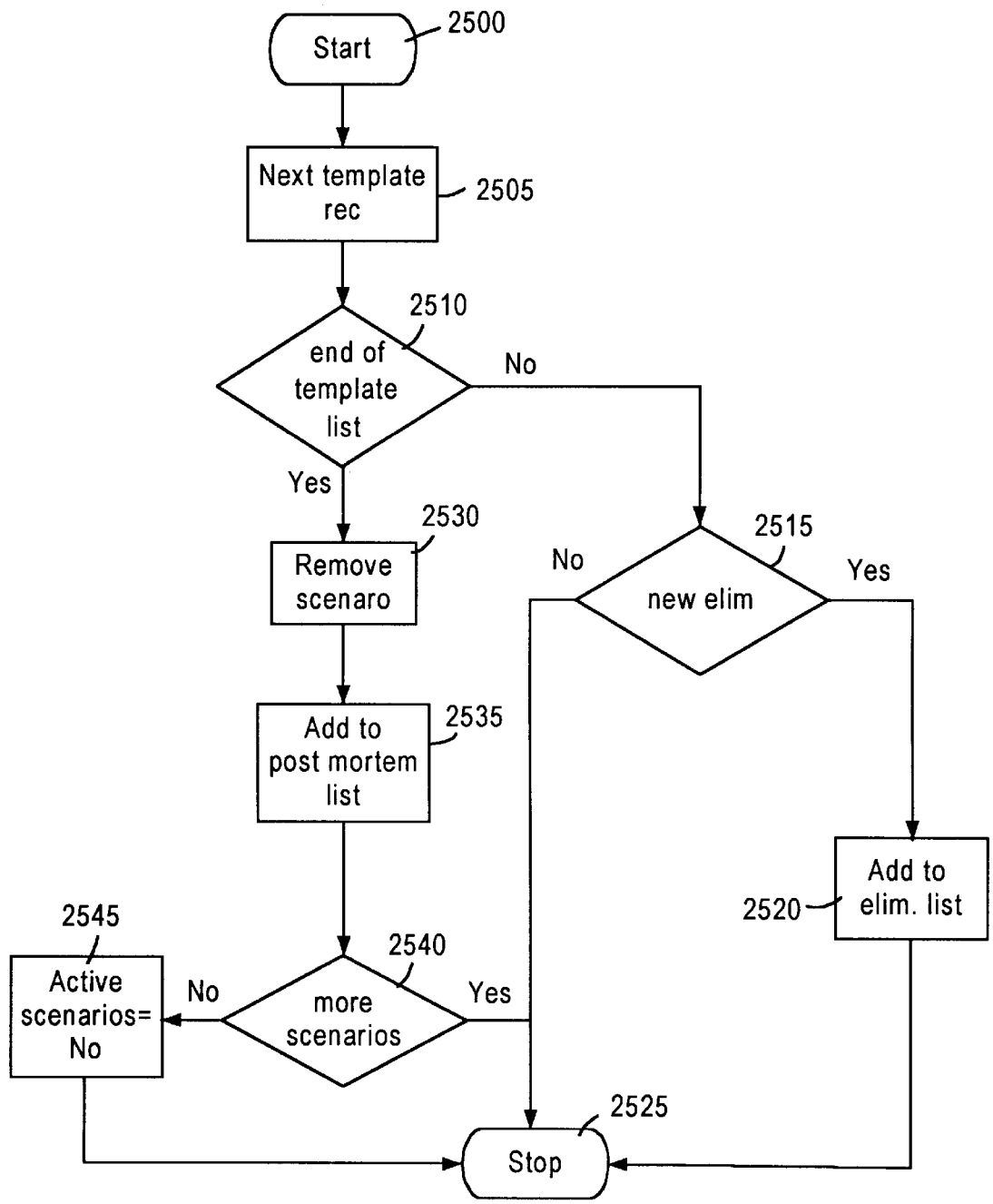

Steps 1845 and 1855 both proceed to step 2500 as illustrated in FIG. 25. FIG. 25 depicts the process of a complex second stage interpretation. At step 2505, the next template record is read in. At step 2510, it is determined whether the end of the template list has been reached. At step 2510, if the end of the template list has not been reached, then it is decided whether to add this elimination scenario (plurality of templates) to the elimination list 1810. If the answer to step 2515 is yes, then at step 2520, the plurality of templates which make up a scenario are added to the elimination list. If the answer to step 2515 is no, then the process stops at step 2525. At step 2530, because the scenario did not generate any matching templates, the scenario is removed at step 2530. At step 2535, the scenario is added to a post-mortem list thereby taking the scenario off of the active scenario list 1835. At step 2540, it is determined whether there are more scenarios to consider. If there are more scenarios to consider, the process proceeds to step 2525 and stops. If there are no more active scenarios, then at step 2545, the process continues to step 2525 and the process is stopped.

Figure 26:
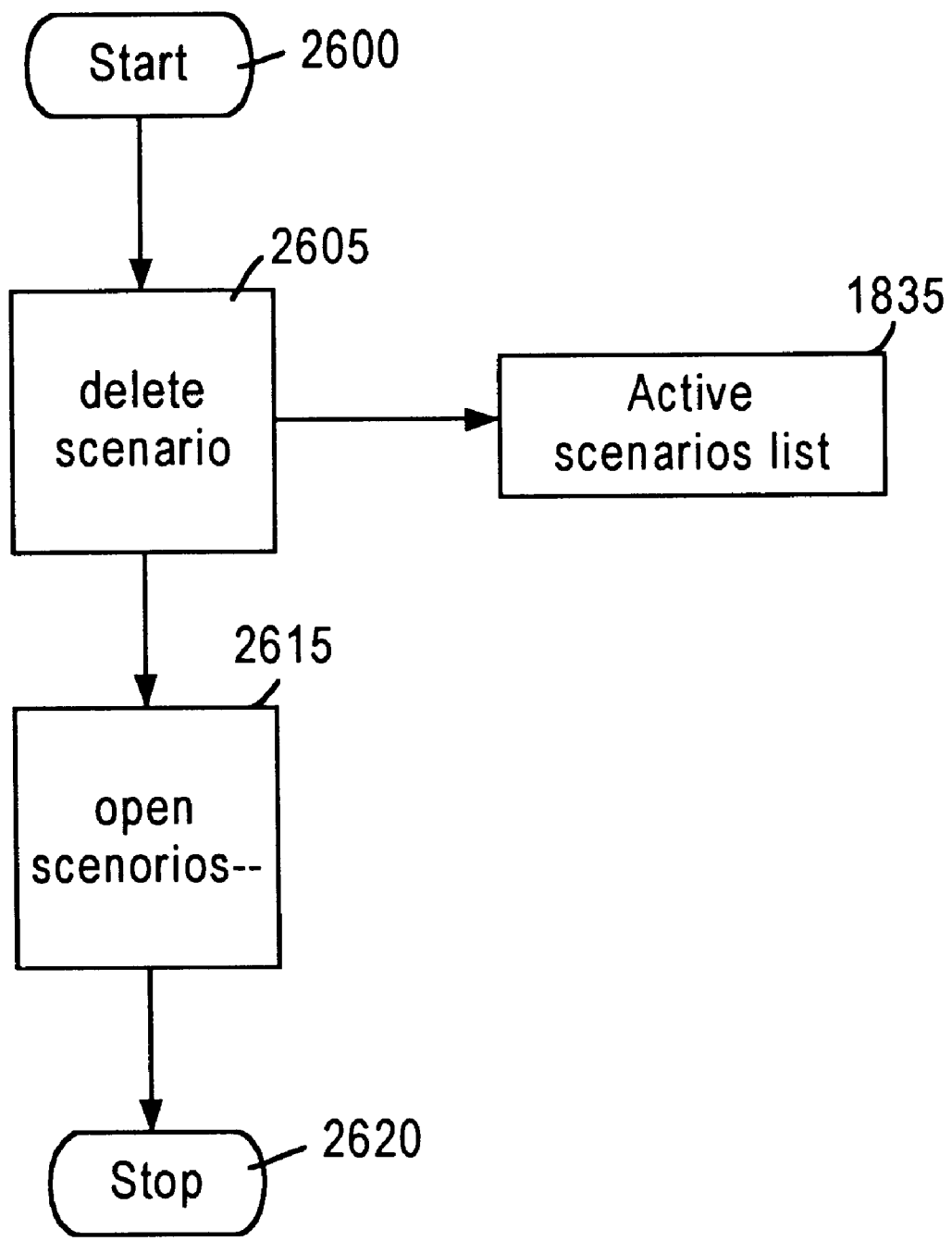

The removed scenario step 2530 is illustrated in greater detail in FIG. 26. At step 2600, the removed scenario step is started. At step 2605, the counter associated with the open scenario list is adjusted by one. The scenario is deleted from the active scenario list 1835. At step 2615, the open scenario list is updated and at step 2620, the removed scenario step is stopped.

Figure 27:
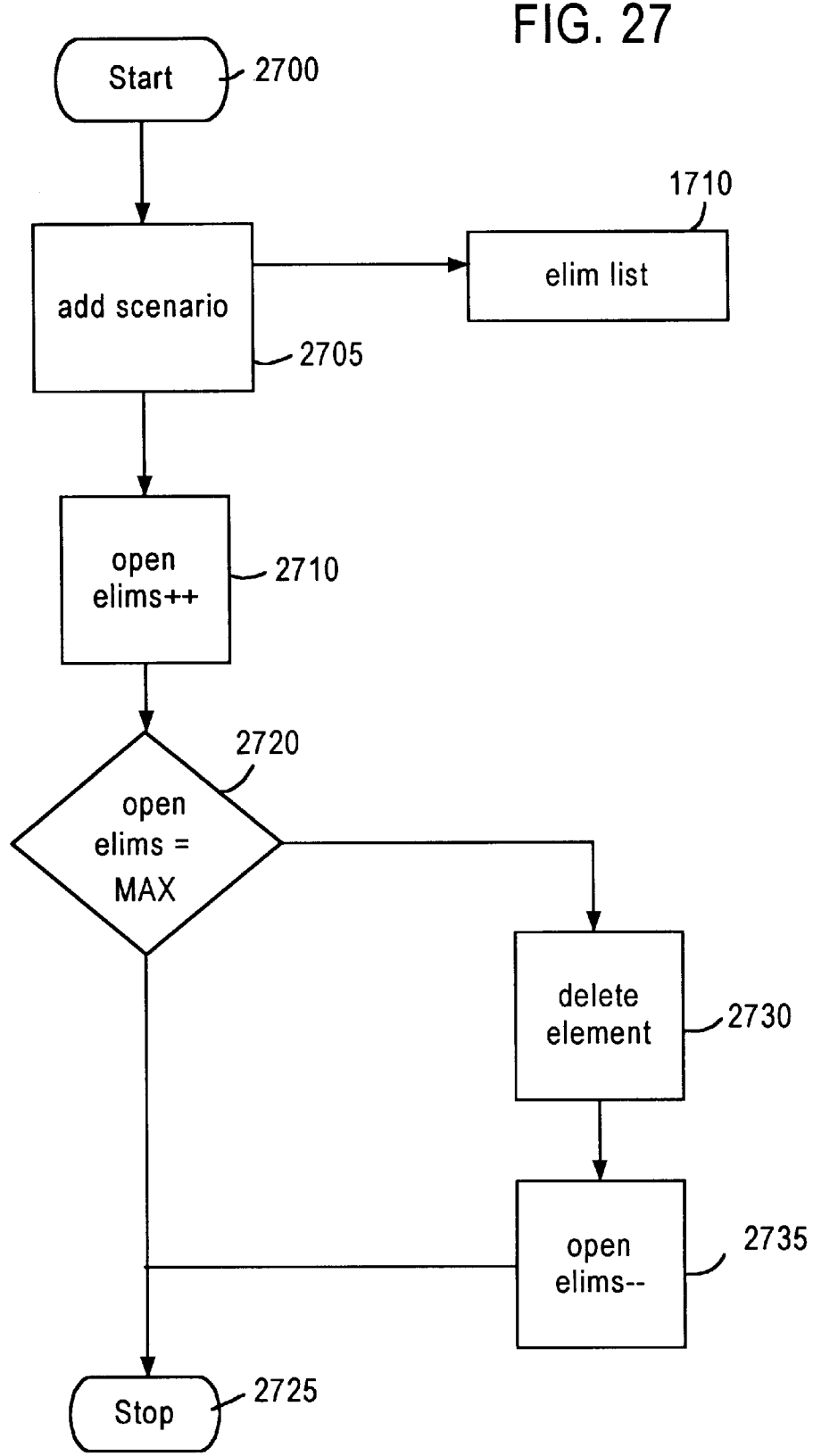

The add to elimination list step 2520 is illustrated in greater detail in FIG. 27. At step 2700, the add to elimination list step is started. At step 2705, the scenario is added to the elimination list 1810. At step 2715, the open elimination list counter is incremented. At step 2720, it is determined whether the open elimination list has reached a maximum size and used up all the memory. If the elimination list 1810 has reached a maximum size, then a scenario is deleted at step 2730 and the open elimination list is revised at step 2735. From either step 2720 or 2735, the process is then stopped at step 2725.

Figure 28:
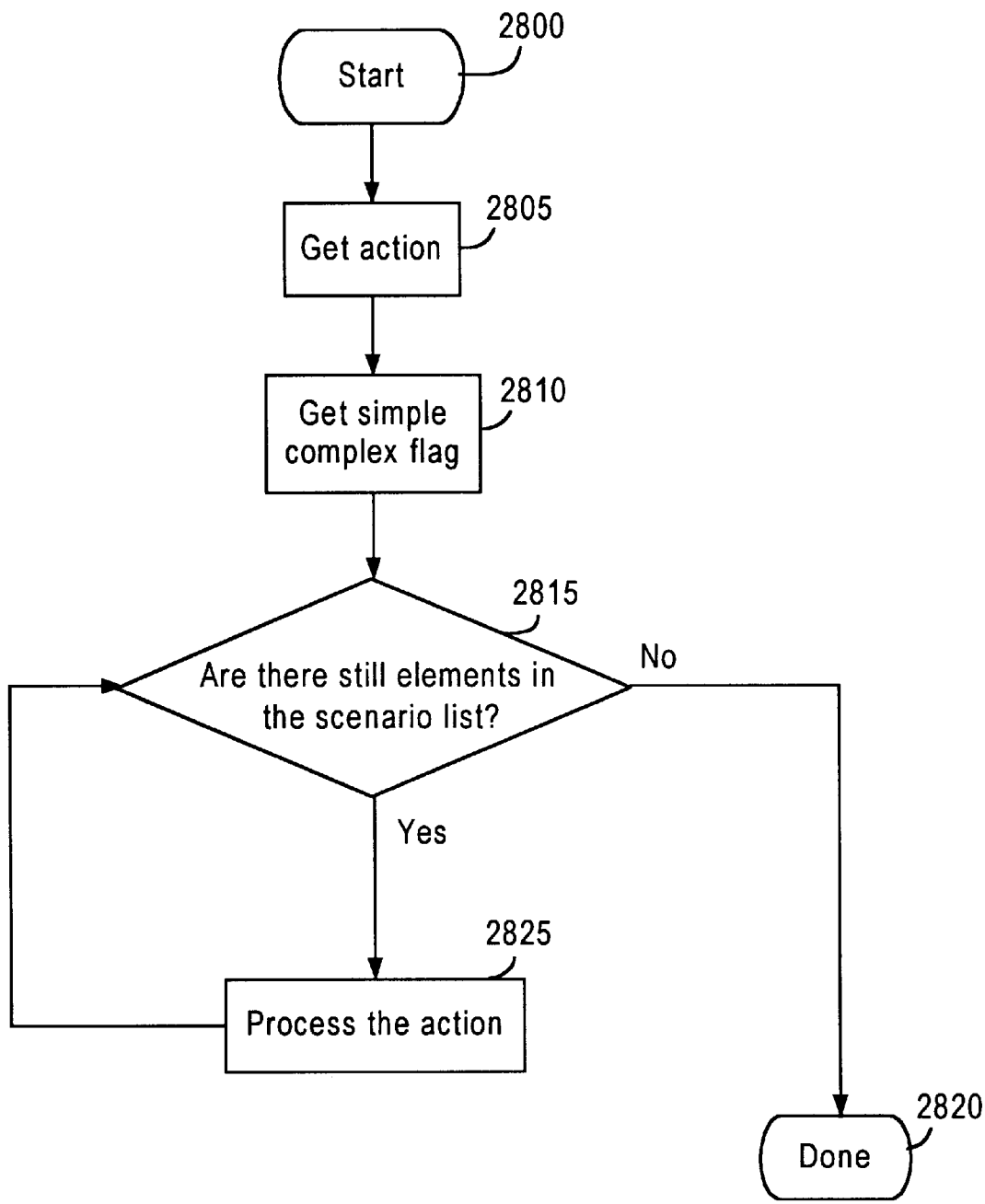

The add scenario step 2705 is illustrated in greater detail in FIG. 28. At step 2800, the process is started. At step 2805, the audit agent 310 gets the action (see FIG. 8). At step 2810, the simple-complex flag is retrieved. At step 2815, it must be determined whether there are still elements in the scenario list. If there are not, then the process proceeds to step 2820 and is complete. If there are still elements in the scenario list then the action is processed at step 2825.

Figure 29:
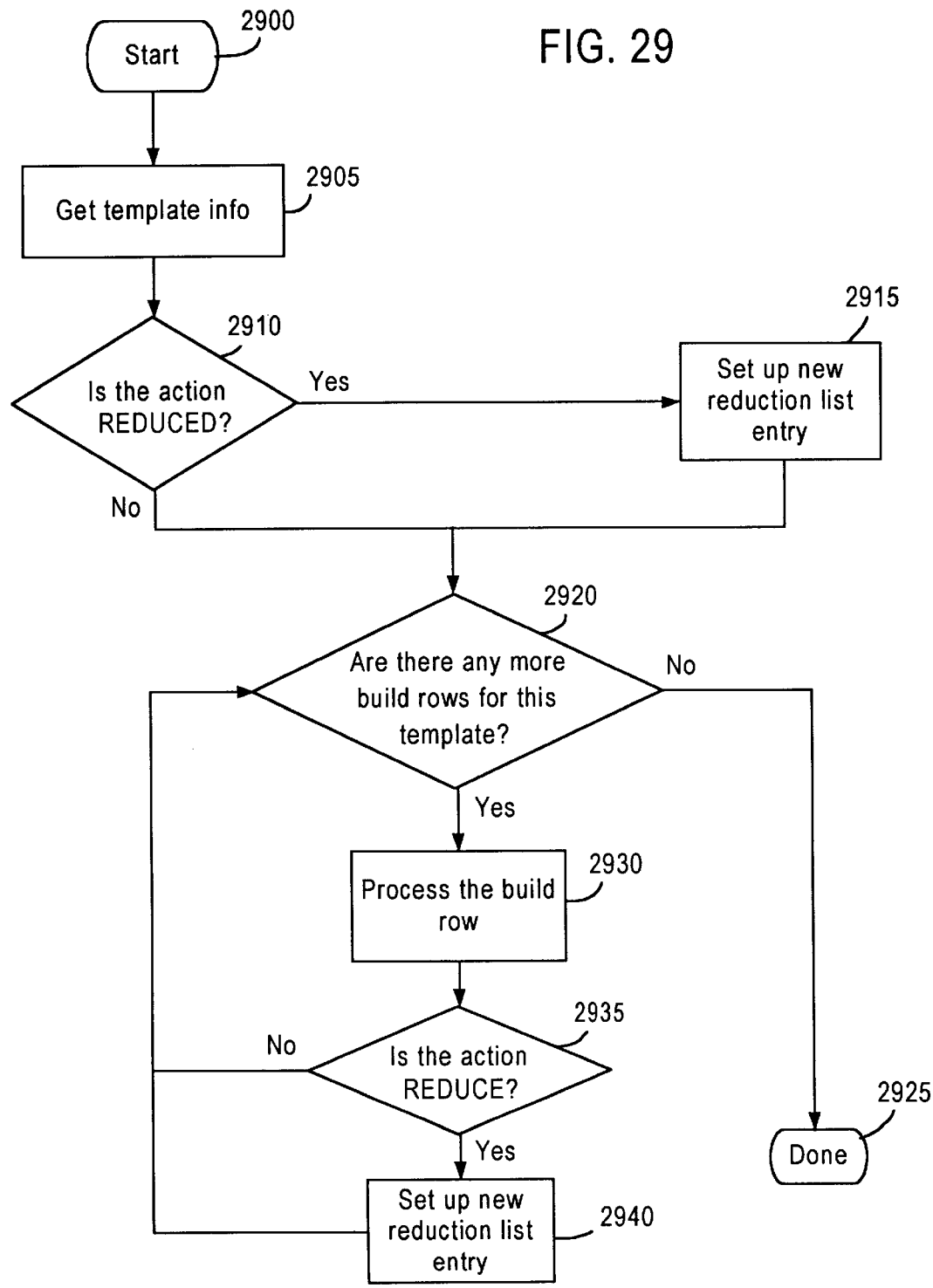

The action step 2825 is illustrated in greater detail in FIG. 29. At step 2900, the process is started. At step 2905, template information is retrieved. At step 2910, it must be determined whether the action is to reduce. If the action is to reduce, then at step 2915, a new reduction list entry is set up. If the action is not to reduce, then at step 2920 it must be determined whether there are any more build rows for this template. If there are not, then at step 2925, the process is complete. If there are more build rows for this template, then at step 2930, the build row is processed. At step 2935, it must be determined whether the action is to reduce. If the action is to reduce, then a new reduction list entry is set up. If the action is not to reduce, then the process returns to step 2920.

Figure 30:
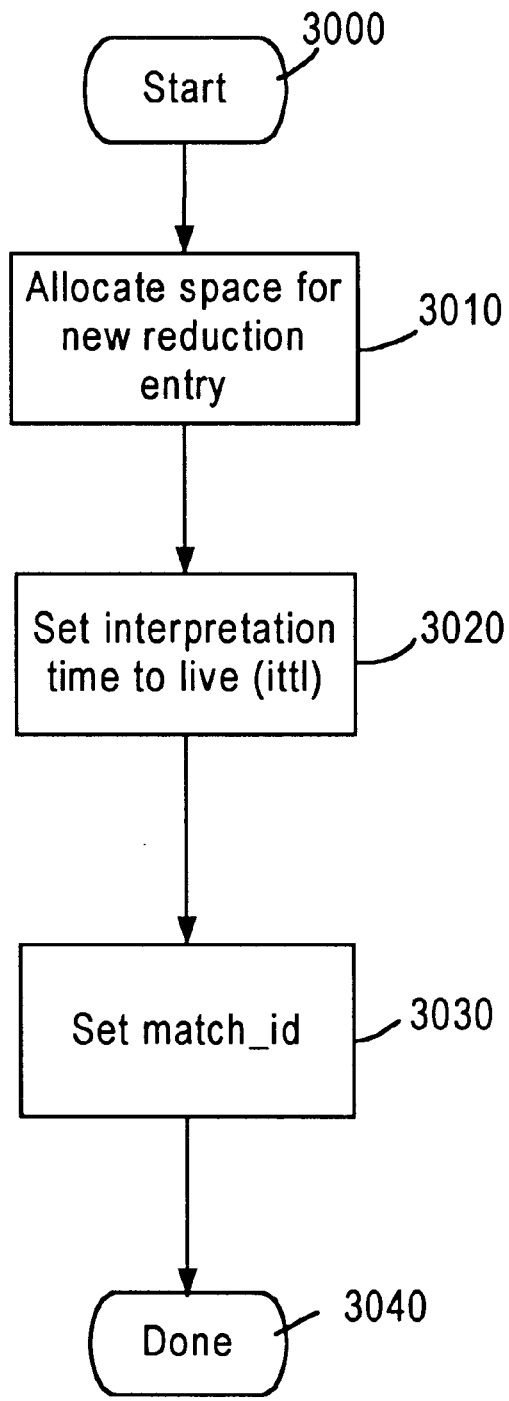

The set up new reduction list entry step 2940 is illustrated in greater detail in FIG. 30. At step 3000, the process is started. At step 3010, space is allocated for a new reduction entry. At step 3020, the interpretation time is set to live. At step 3030, the match __ID is set and at 3040, the process is complete.

Figure 31:
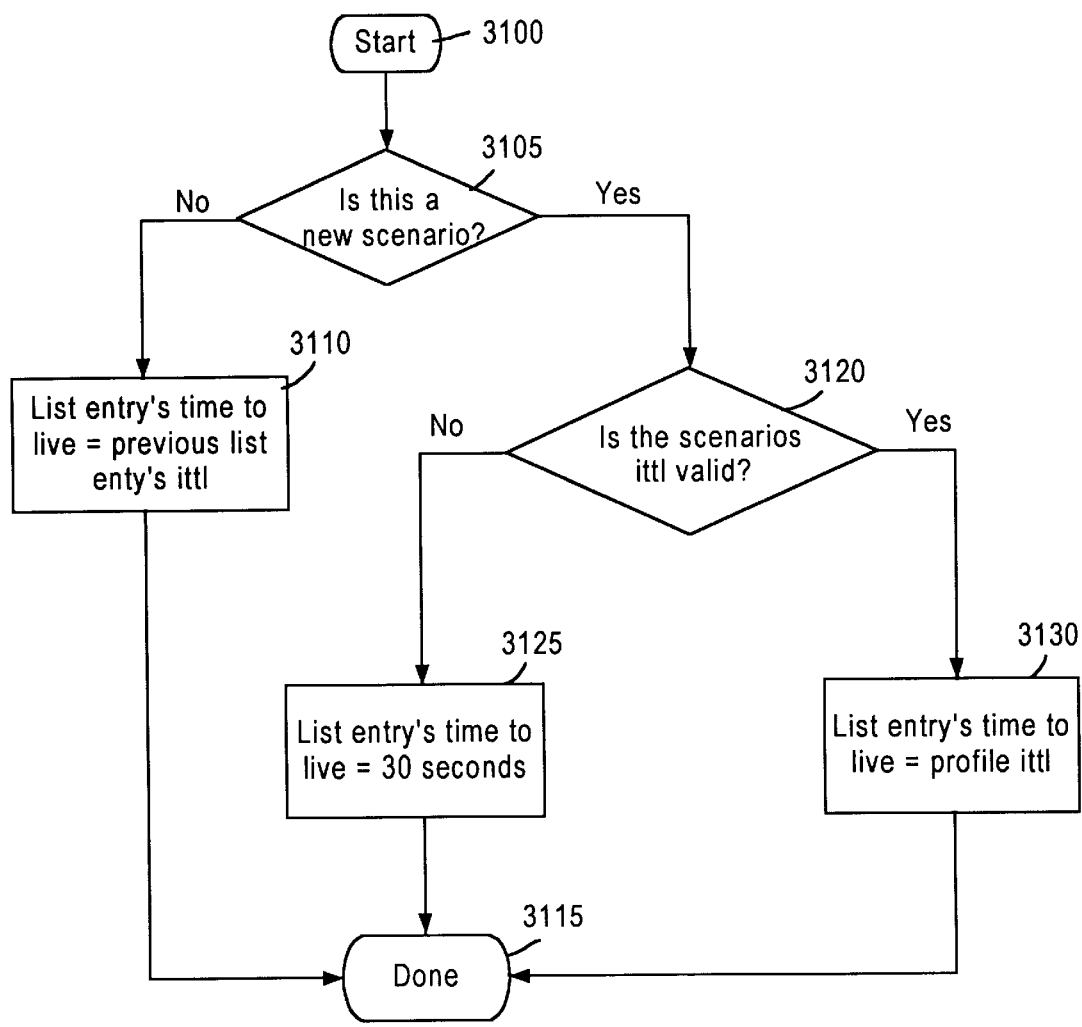

The set interpretation time to live (ittl), step 3020, is illustrated in greater detail in FIG. 31. At step 3100, the process is started. At step 3105, it is determined whether this is a new scenario. If it is not a new scenario, then at step 3110, the entries time to live is listed as equal to the previous list entries ittl. At step 3115, the process is complete. At step 3105, if this was a new scenario, then at step 3120, it must be determined whether the scenarios ittl is valid. If the scenarios ittl is valid, then at step 3130, the entries time to live is listed as equal to the scenarios ittl. If at step 3120, the scenarios ittl is not valid, then at step 3125, the entries time to live is listed as equal to 30 seconds. From either steps 3125 or 3130 the process is complete at step 3115.

Figure 32:
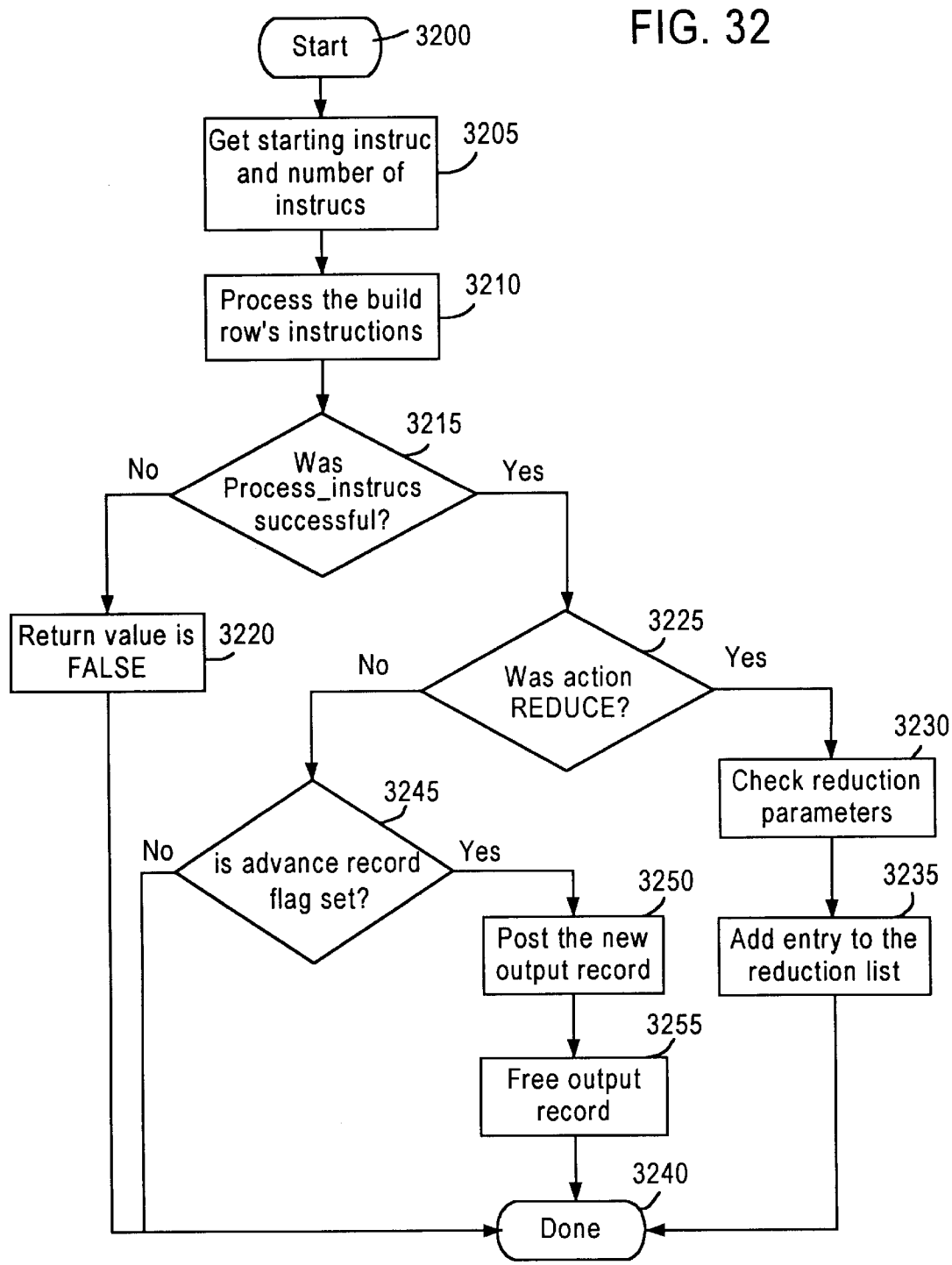

The build row step 2930 is illustrated in greater detail in FIG. 32. At step 3200, the process is started. At step 3205, the starting instructions and number of instructions are retrieved. At step 3210, the build rows instructions are processed. At step 3215, it is determined whether the process instructions were successful. If the process instructions were not successful, then a return value is listed as false at step 3220. If the process instructions step 3215 was successful, then at step 3225, it is determined what was the action to reduce. If the action was to reduce at step 3225, then at step 3230, the reduction parameters are checked. At step 3235, the entry is added to the reduction list. At step 3240, the process is complete. At step 3225, if the action was not to reduce, then at step 3245, it must be determined whether the advance record flag was set. If the advance record flag was not set, then the process is completed at step 3240. If the advance record flag was set, then at step 3250, the new output record is posted. At step 3255, the output record is free and at step 3240, the process is complete.

Figure 33:
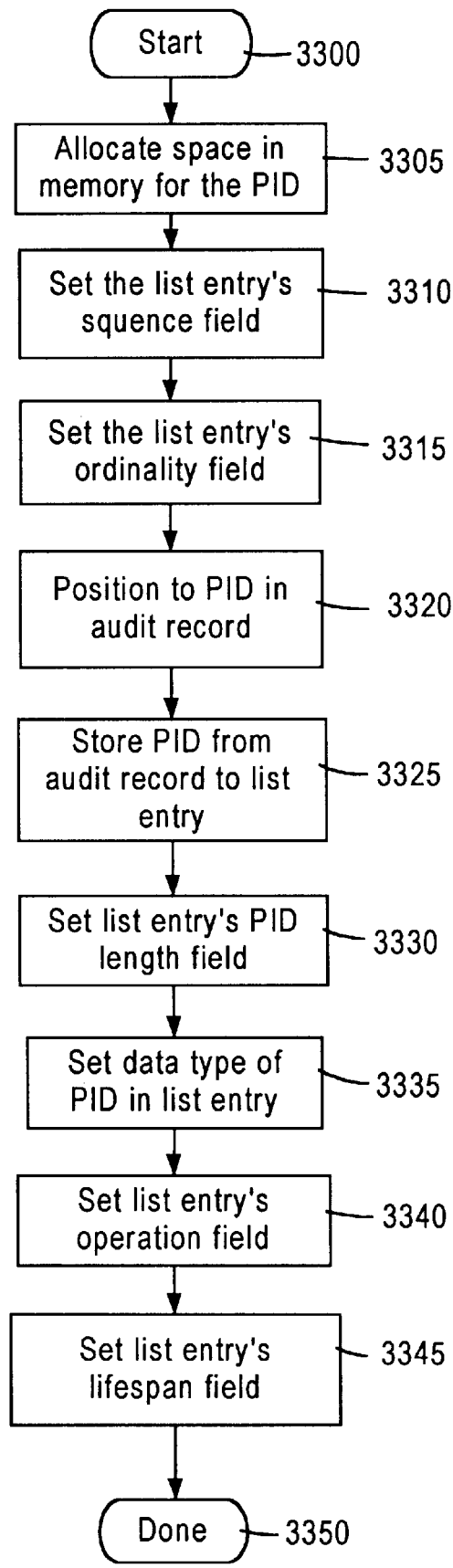

The process to build rows instruction step 3210 is illustrated in greater detail in FIG. 33. At step 3300, the process is started. At step 3305, spaces are allocated in the memory for the primary identifier (PID). At step 3310, the list entries sequence field is set. At step 3315, the list entries ordinality field is set. At step 3320, a pointer is positioned to the primary identifier in the audit record. At step 3325, the primary identifier is stored from the audit record to the list entries. At step 3330, the list entries primary discriminator length field is set. At step 3335, the data type of the primary discriminator and list entry is set. At step 3340, the list entries operations field is set. At step 3345, the list entries life span field is set. At step 3350 the process is complete.

Figure 34:
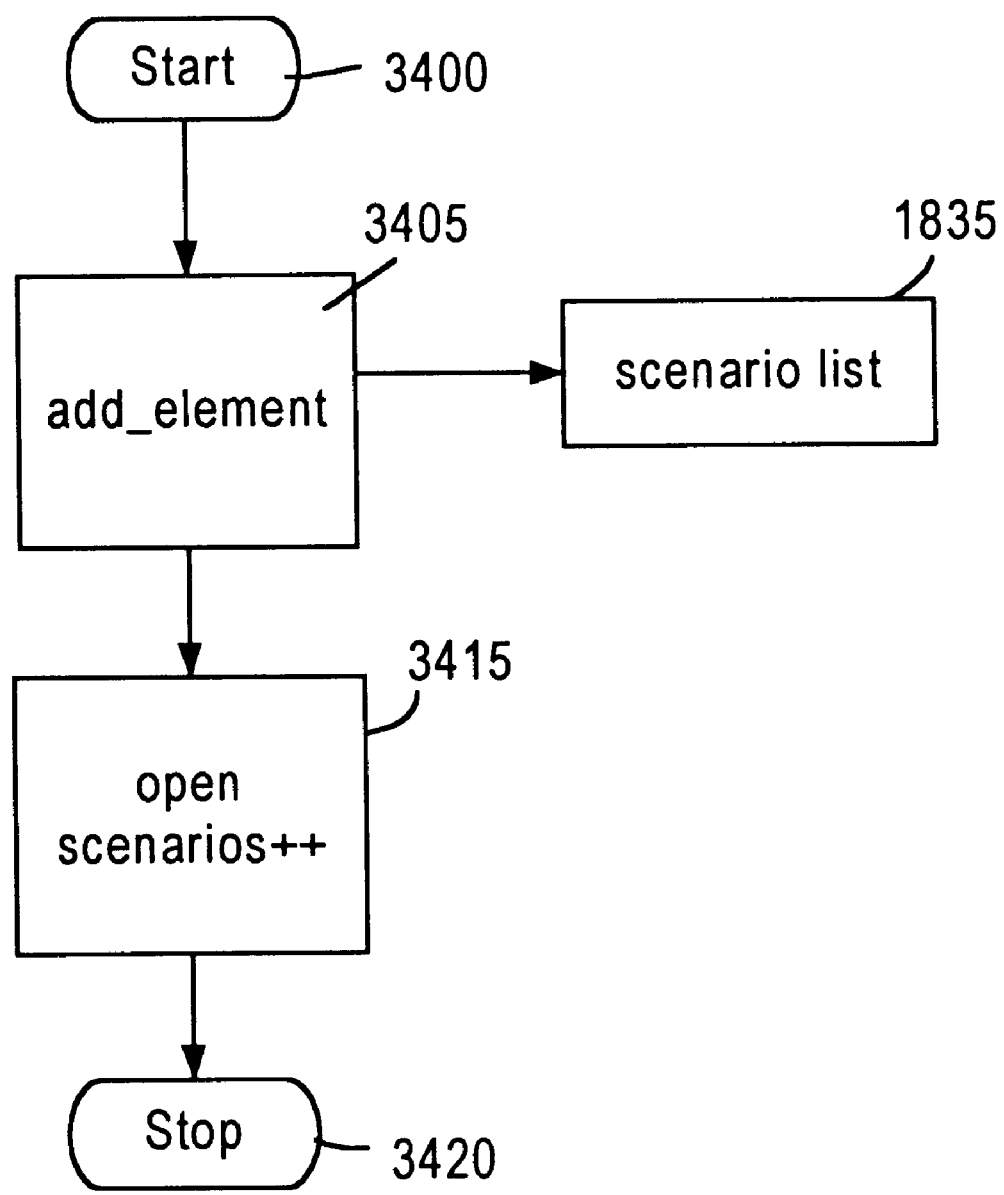

The active scenario list step 1845, is illustrated in greater detail in FIG. 34. At step 3400, the process is started. At step 3405, an element is added to the active scenario list 1835. At step 3415, open scenarios are added. At step 3420, the process is complete.

Figure 35:
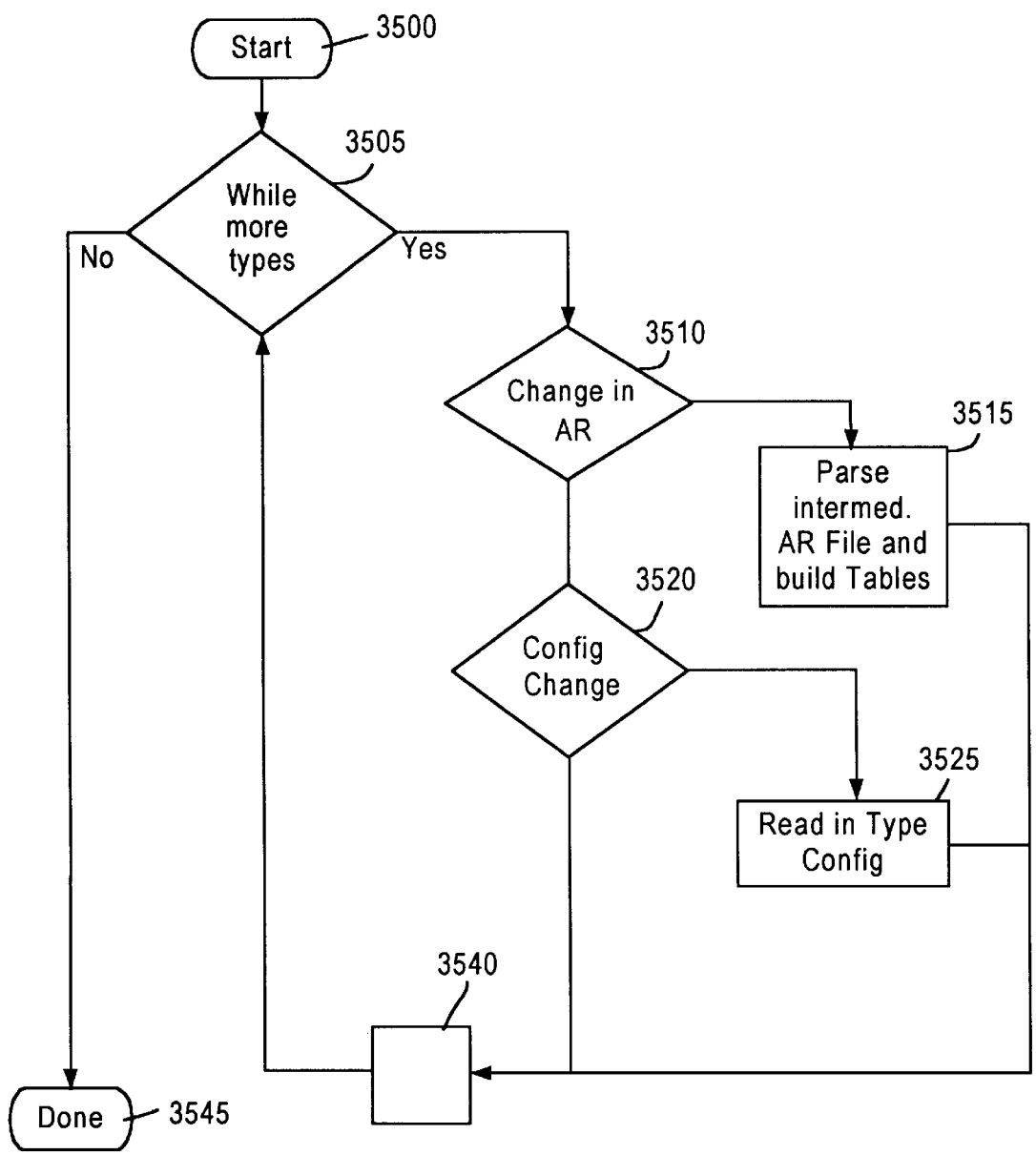

The reread parameters step 830 is illustrated in greater detail in FIG. 35. At step 3500, the process is started. At step 3505, the process waits for more types of audit data. If more data types are received, at step 3510, there is a change the audit reduction file. At step 3515, the intermediate audit reduction file and tables are parsed. If there is no change in the audit reduction at step 3510, then the configuration is changed at step 3520. If the configuration is changed at step 3520, then at step 3525, the configuration type is read. From either step 3515 or 3525, the process continues to step 3540 and then loops back to step 3505. When all of the audit types have been completed, then the process is complete at step 3545.

Figure 36:
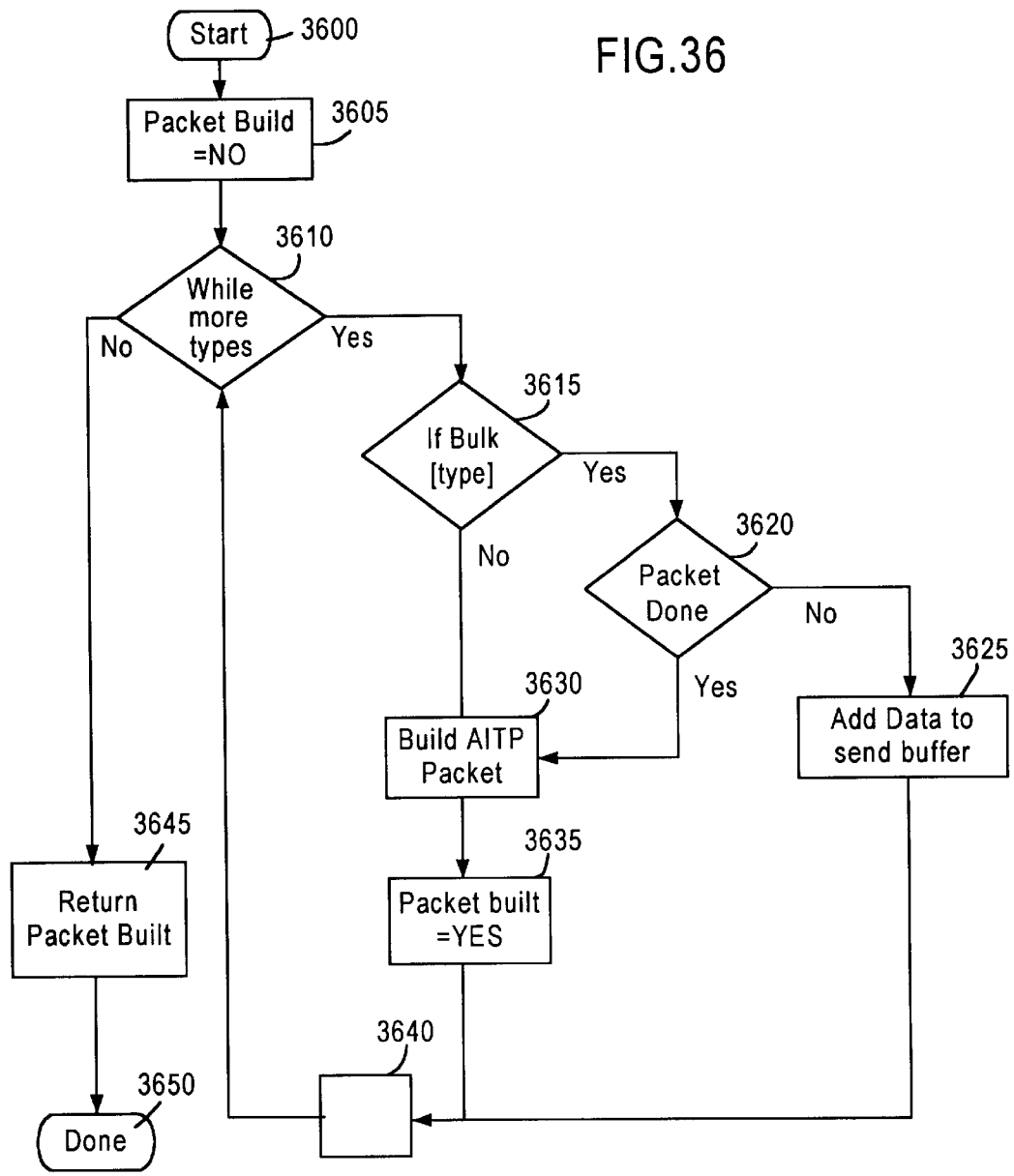

The package audit data step 840 is illustrated in greater detail in FIG. 36. At step 3600, the process is started. At step 3605, the packet built is equal no. At step 3610, the process waits for more types of audit data. At step 3615, if the data is being received in bulk, it must be determined what type of data is being received. If it is bulk data then it must be packetized at step 3620 and if the packet is not completed, then at step 3625, the unpacketed data is sent to a buffer and then to step 3640. After the packet is complete or if the data is not a bulk type data, then step 3630, AITP (Audit Information Transfer Protocol) packets are built. At step 3635, a signal is sent that the packet is built and the process proceeds to step 3640. After all of the data types have been received in step 3610, then the process proceeds to step 3645 where the return packet is built and at step 3650 the process is complete.

Figure 37:
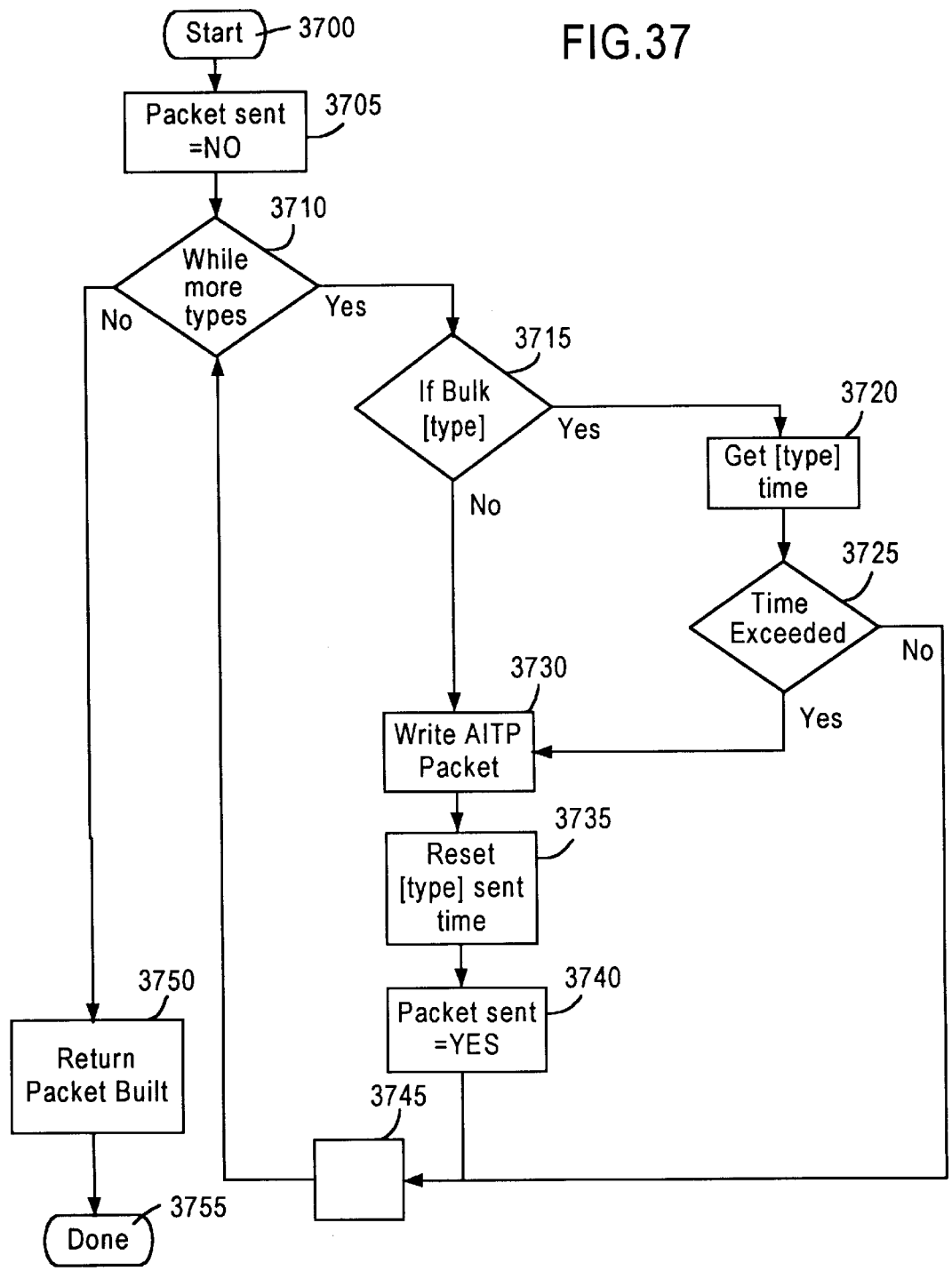

The send data step 850 of FIG. 8 is illustrated in greater detail in FIG. 37. At step 3700, the process is started. At step 3705, a message is sent that the packet has not been sent. At step 3710, the process waits for more native audit types. At step 3715, it determines whether the data is being received in bulk. If the data is being received in bulk, then at step 3720, it determines the type and the amount of time to process the bulk data. At step 3725, it must be determined whether the time has been exceeded to process the bulk data. If the time has not been exceeded, then the process proceeds to step 3745 and back to step 3710. If the time has been exceeded at step 3725, then at step 3730, then an AITP packet. At step 3735, the time sent is reset. At step 3740, a signal is sent that the packet has been sent. The process then proceeds back to step 3710. From step 3710, the process proceeds to step 3750 where a return packet is built and at step 3755, the process is complete.

Figure 38:
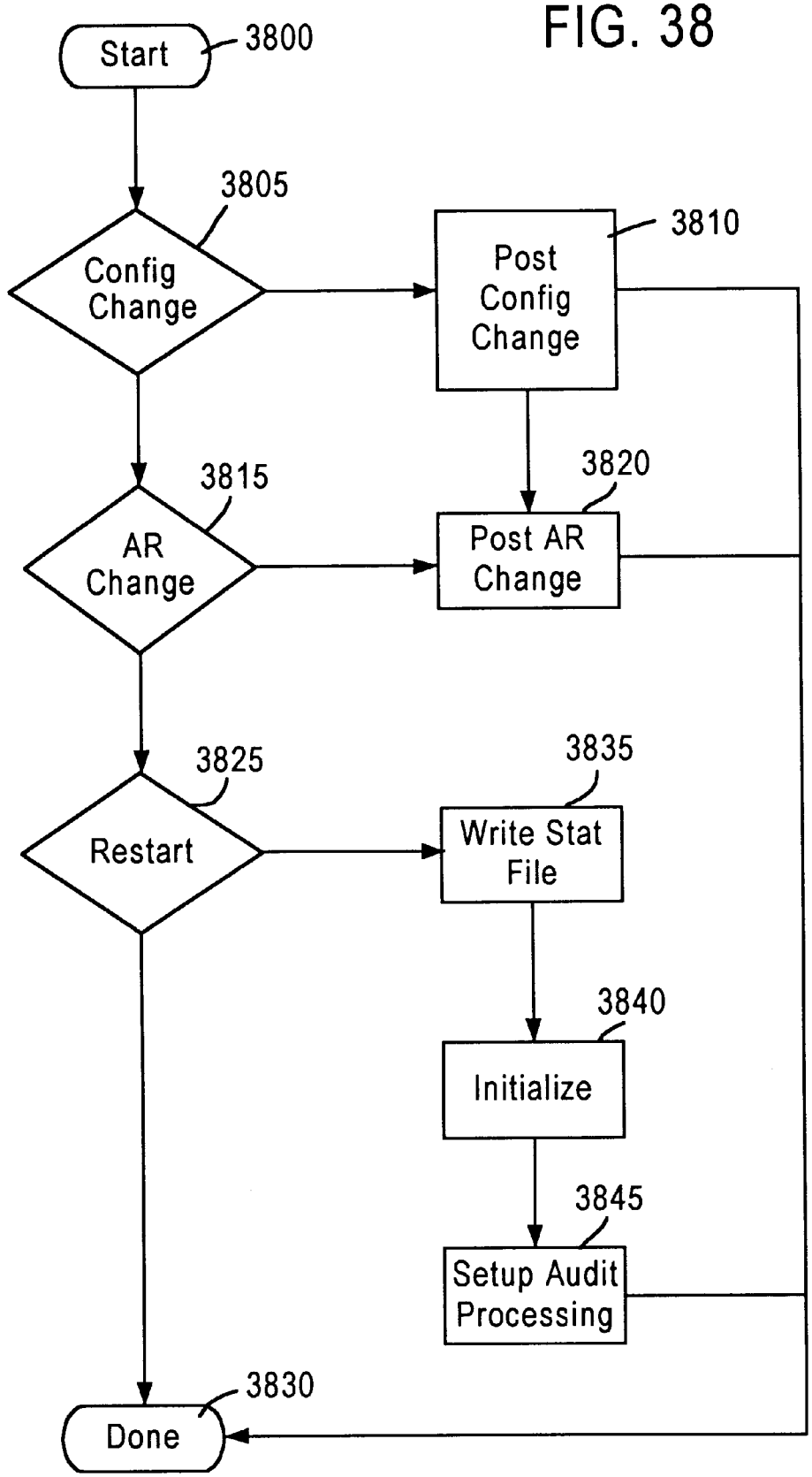

FIG. 38 is directed to a configuration change for the audit reduction agent 310. At step 3800, the process is started. At step 3805, it is determined whether a configuration change command has been received. At step 3810, if a configuration change command signal has been received, then the configuration is changed at 3810. After the configuration change is posted at step 3810, the process is completed at step 3830.

If there has been no configuration change at step 3805, then at step 3815, it is checked to determine whether there has been an audit reduction change. If there has been an audit reduction change then at step 3820, the audit reduction change is posted and the process is completed at step 3830. If there has been no audit reduction change at step 3815 then at step 3825 the process is restarted. At step 3835, a stat file is ridden. At step 3840, the stat file is initialized. At step 3845, processing is set up. From either steps 3825 or 3845, the process proceeds to step 3830 and is complete.

Figure 39:
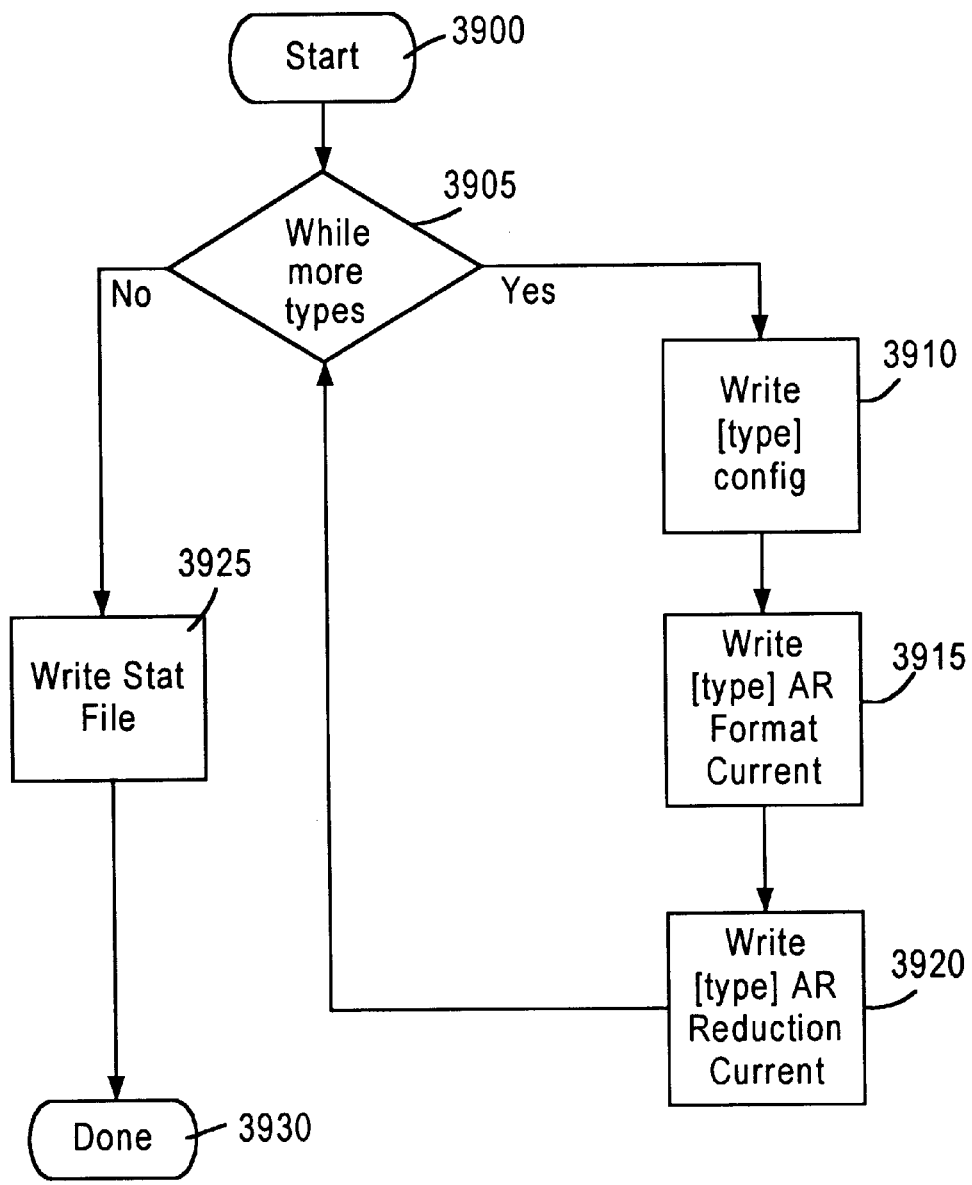

The right stat file step 3835 is illustrated in greater detail in FIG. 39. At step 3900 the process is started. At step 3905, the process waits for more data types. If more data types are to be received, then at step 3910, the type of data configuration is written. At step 3915, the current AR format is written. At step 3920, the current AR reduction type is written and the process loops back to step 3905. If there are no more data types to be received, then at step 3925, the stat file is written and at step 3930, the process is complete.

It should now be apparent from the foregoing detailed description that a method of analyzing native audit data has been described. Advantageously, the method compares an audit record against one or more templates and against one or more audit records to determine whether the audit record might be indicative of a potential security threat. If the audit record is not considered to present a potential security threat, then the audit record is reduced. If the audit record or records represent a potential security threat, then the audit record or records are normalized to a standardized format for further evaluation by a misuse and intrusion detection engine.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of reducing the volume of native audits received from at least one operating system, each of the native audits being in a particular format, comprising:

identifying the particular format for each of the received native audits;

comparing each of the received identified native audits against at least one template and determining if each of the native audits matches at least one template; and eliminating all of the matched native audits before a misuse and intrusion detection engine further analyzes the native audits.

2. The method of claim 1, further comprising transforming selected ones of the native audits to a standardized output.

3. The method of claim 2, further comprising outputting the transformed audits to a transformed audit storage device.

4. The method of claim 2, comprising associating each of the native audits with an output template for transforming the native audit to the standardized output format.

5. The method of claim 1, wherein the native audits comprise at least one of system audit trails; system log file data; and data from third party applications and programs.

6. The method of claim 1, comprising associating each of the native audits with a global format template, each of the global format templates including a listing of additional templates against which each of the associated native audits should be compared.

7. The method of claim 1, further comprising outputting the native audits to a native audit storage device.

8. The method of claim 1, comprising comparing one of the received native audits against a single template and either reducing the native audit and sending the native audit to a native audit storage device or transforming the native audit and sending the transformed audit to the transformed audit storage device.

9. The method of claim 1, comprising comparing one of the received native audits against a plurality of templates and either reducing the native audit and sending the native audit to a native audit storage device or transforming the native audit and sending the transformed audit to the transformed audit storage device.

10. The method of claim 1, comprising comparing a plurality of the received native audits against a plurality of templates and either reducing the plurality of native audits and sending the plurality of native audits to a native audit storage device or transforming the plurality of native audits and sending the plurality of transformed audits to the transformed audit storage device.

11. The method of claim 10, wherein the native audits are in one of a contextual format or a positional format.

12. The method of claim 1, comprising setting up at least one possible scenario and comparing the received native audits against the at least one possible scenario and activating the at least one possible scenario to become an in-progress scenario.

13. The method of claim 12, comprising comparing subsequently received native audits against the in-progress scenario, a successfully completed scenario becoming an elimination list.

14. The method of claim 13, comprising comparing each of the received native audits against the elimination list and if the received native audit matches a record on the elimination list, reducing the matched native audit.

15. The method of claim 1, wherein each template describes a weighting system using barriers and boundaries so that a potential misuse or intrusion can be detected before it occurs.

16. An article of manufacture which includes instructions for reducing the volume of native audits received from at least one operating system, each of the native audits being in a particular format, wherein the instructions are on a computer readable medium to be executed by a computer system, comprising:

identifying the particular format for each of the received native audits;

compare each of the received identified native audits against at least one template and determine if each of the native audits matches at least one template; and eliminate all of the matched native audits before a misuse and intrusion detection engine further analyzes the native audits.

17. The article of claim 16, wherein each template describes a weighting system using barriers and boundaries so that a potential misuse or intrusion can be detected before it occurs.

18. A computer architecture for reducing the volume of native audits received from at least one operating system, each of the native audits being of particular format, comprising:

identifying means for identifying a particular format for each of the received native audits;

comparing means for comparing each of the received identified native audits against at least one template and determining if each of the native audits matches at least one template; and eliminating means for eliminating of the native audits before a misuse and intrusion detection engine further analyzes the native audits.

19. The computer architecture of claim 18, wherein each template describes a weighting system using barriers and boundaries so that a potential misuse or intrusion can be detected before it occurs.

20. A computer system, comprising:

a processor; and a memory coupled to said processor, the memory having stored therein sequences of instructions for reducing the volume of native audits received from at least one operating system, each of the native audits being in a particular format, the instructions which, when executed by said processor, causes the processor to perform the steps of:

identifying a particular format for each of the received identified native audits;

compare each of the received identified native audits against at least one template and determine if each of the native audits matches at least one template; and eliminate all of the matched audits before a misuse and intrusion detection engine further analyzes the native audits.

21. The computer system of claim 20, wherein each template describes a weighting system using barriers and boundaries so that a potential misuse or intrusion can be detected before it occurs.

* * * * *